(12) United States Patent
Aoyama et al.

(10) Patent No.: US 9,596,631 B2
(45) Date of Patent: Mar. 14, 2017

(54) COMMUNICATION TERMINAL

(75) Inventors: Takahisa Aoyama, Kanagawa (JP); Jun Hirano, Kanagawa (JP); Takashi Tamura, Kanagawa (JP)

(73) Assignee: Sun Patent Trust, New York, NY (US)

( * ) Notice: Subject to any disclaimer, the term of this patent is extended or adjusted under 35 U.S.C. 154(b) by 236 days.

(21) Appl. No.: 13/379,471

(22) PCT Filed: May 25, 2010

(86) PCT No.: PCT/JP2010/003501
§ 371 (c)(1),
(2), (4) Date: Dec. 20, 2011

(87) PCT Pub. No.: WO2010/150462
PCT Pub. Date: Dec. 29, 2010

(65) Prior Publication Data
US 2012/0099466 A1 Apr. 26, 2012

(30) Foreign Application Priority Data

Jun. 22, 2009 (JP) ................................ 2009-147778

(51) Int. Cl.
*H04W 24/00* (2009.01)
*H04W 36/00* (2009.01)
(Continued)

(52) U.S. Cl.
CPC ......... *H04W 36/0083* (2013.01); *H04L 5/001* (2013.01); *H04L 5/0091* (2013.01); *H04L 5/0053* (2013.01); *H04W 24/10* (2013.01)

(58) Field of Classification Search
USPC .......... 370/252, 329, 331, 332, 328; 455/62, 455/67.11, 67.13, 422.1, 436, 437, 442,
(Continued)

(56) References Cited

U.S. PATENT DOCUMENTS

2008/0311900 A1 12/2008 Pica et al.
2009/0067386 A1* 3/2009 Kitazoe ........................ 370/332
(Continued)

FOREIGN PATENT DOCUMENTS

CN 101394199 A 3/2009
EP 1 927 226 4/2007
(Continued)

OTHER PUBLICATIONS

ETSI TS 136 101 V8.5.1 (Apr. 2009) (LTE; Evolved Universal Terrestrial Radio Access (E-UTRA); User Equipment (UE) radio transmission and reception (3GPP TS 36.101 version 8.5.1 Release 8)), Apr. 2009, pp. 9, 16.*
(Continued)

*Primary Examiner* — Hanh N Nguyen
*Assistant Examiner* — Jose L Perez
(74) *Attorney, Agent, or Firm* — Seed IP Law Group LLP

(57) ABSTRACT

A communication terminal is capable of simultaneously communicating through a plurality of carriers by carrier aggregation, and the communication terminal comprises: a quality measurement unit for measuring the reception quality of a radio wave transmitted through a plurality of carriers from a base station of a connected cell to obtain a measured value; a primary carrier storage unit storing information specifying a primary carrier chosen from the plurality of carriers; a comparator for comparing a measured value of the primary carrier measured by the quality measurement unit to a threshold value; and a cell search unit for searching for another cell when the measured value of the primary carrier is less than or equal to the threshold value. Consequently, a search threshold value for carrier aggregation can be appropriately determined to perform a cell search and a quality measurement.

16 Claims, 30 Drawing Sheets

(51) Int. Cl.
*H04L 5/00* (2006.01)
*H04W 24/10* (2009.01)

(58) Field of Classification Search
USPC .................................................. 455/443, 525
See application file for complete search history.

(56) References Cited

U.S. PATENT DOCUMENTS

| | | | | |
|---|---|---|---|---|
| 2009/0203376 | A1* | 8/2009 | Sambhwani ......... | H04J 11/0069 455/434 |
| 2009/0270103 | A1* | 10/2009 | Pani .................. | H04W 36/0083 455/436 |
| 2009/0310563 | A1* | 12/2009 | Chou et al. .................... | 370/331 |
| 2010/0035615 | A1* | 2/2010 | Kitazoe et al. ............... | 455/436 |
| 2010/0216455 | A1* | 8/2010 | Kazmi ................. | H04J 11/0093 455/424 |
| 2010/0222060 | A1* | 9/2010 | Zhang .................. | H04W 36/30 455/436 |
| 2010/0246534 | A1* | 9/2010 | Vargantwar et al. ......... | 370/332 |
| 2010/0296467 | A1* | 11/2010 | Pelletier et al. .............. | 370/329 |
| 2010/0311421 | A1* | 12/2010 | Mach ............................ | 455/436 |
| 2010/0322185 | A1* | 12/2010 | Park et al. ..................... | 370/331 |
| 2011/0002281 | A1* | 1/2011 | Terry et al. .................... | 370/329 |
| 2011/0142009 | A1* | 6/2011 | Lindoff et al. ................ | 370/332 |

FOREIGN PATENT DOCUMENTS

| | | | | |
|---|---|---|---|---|
| SE | WO 2009120125 | A1 * | 10/2009 | .......... H04L 5/0053 |
| SE | WO 2009148381 | A1 * | 12/2009 | ............ H04W 24/10 |
| WO | 2007/038358 | A2 | 4/2007 | |
| WO | WO 2009120125 | A1 * | 10/2009 | |

OTHER PUBLICATIONS

ETSI TS 136 101 V8.5.1 (Apr. 2009) (LTE; Evolved Universal Terrestrial Radio Access (E-UTRA); User Equipment (UE) radio transmission and reception (3GPP TS 36.101 version 8.5.1 Release 8)), cover, p. 16.*
3GPP TR 21.905 V8.8.0, "Vocabulary for 3GPP Specifications," 3rd Generation Partnership Project, Technical Specification Group Services and System Aspects, Release 8, Mar. 2009, pp. 1-57.
3GPP TS 36.101 V8.5.1, "User Equipment (UE) radio transmission and reception," 3rd Generation Partnership Project, Technical Specification Group Radio Access Network, Evolved Universal Terrestrial Radio Access (E-UTRA); Release 8, Mar. 2009, pp. 1-121.
3GPP TS 36.321 V8.5.0, "Medium Access Control (MAC) protocol specification," 3rd Generation Partnership Project, Technical Specification Group Radio Access Network; Evolved Universal Terrestrial Radio Access (E-UTRA), Release 8, Mar. 2009, pp. 1-46.
3GPP TS 36.331 V8.5.0, "Radio Resource Control (RRC)," 3rd Generation Partnership Project, Technical Specification Group Radio Access Network, Evolved Universal Terrestrial Radio Access (E-UTRA), Protocol specification, Release 8, Mar. 2009, pp. 1-204.
International Search Report for PCT/JP2010/003501, mailed Aug. 31, 2010, 3 pages.
NTT Docomo, "Initial Access Procedure for Asymmetric Wider Bandwidth in LTE-Advanced," R1-092099, 3GPP TSG RAN WG1 Meeting #57, San Francisco, California, USA, May 4-8, 2009, pp. 1-5.
Panasonic, "Synchronization channel and system information for Carrier Aggregation," R2-092866, R1-091750, 3GPP TSG RAN WG2 Meeting #66, San Francisco, California, USA, May 4-8, 2009, 4 pages.
Samsung, "Initial random access in asymmetric carrier aggregation," R1-091881, 3GPP TSG RAN WG1 Meeting #57, San Francisco, California, USA, May 4-8, 2009, 5 pages.
Japanese Office Action dated Apr. 1, 2014, for corresponding JP Application No. 2011-519509, 3 pages.
Nokia Siemens Networks, Nokia, "Primary Component Carrier Selection, Monitoring, and Recovery," R1-091779, Agenda Item: 15.7, 3GPP TSG RAN WG1 #57 Meeting, San Francisco, US, May 4-8, 2009, 6 pages.
English Translation of Chinese Search Report dated Sep. 3, 2014, for corresponding CN Application No. 2010800279560, 2 pages.
CMCC, "Further considerations on anchor carrier for CA," R2-093263, 3GPP TSG-RAN WG2 Meeting #66, Agenda Item: 7, San Francisco, USA, May 4-8, 2008, 4 pages.
Japanese Office Action dated Jun. 2, 2015, for corresponding JP Application No. 2014-154051, 4 pages.
Panasonic, "Measurement configuration modeling and other related issues," R2-102760, 3GPP TSG RAN WG2 #70, Agenda Item: 7.1.7, May 10-14, Montreal, Canada, 6 pages.
Panasonic, "Synchronization channel and system information for Carrier Aggregation," R1-091750 (R2-092866), 3GPP TSG RAN WG1 #57, Agenda Item: 15.4, May 4-8, 2009, San Francisco, USA, 4 pages.
Extended European Search Report, dated Apr. 11, 2015, for corresponding EP Application No. 10791788.2-1854 / 2448322, 7 pages.

* cited by examiner

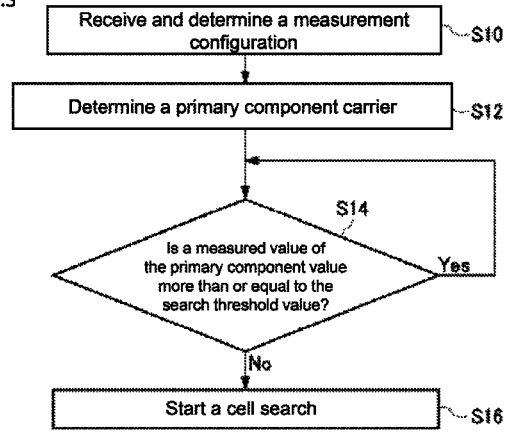
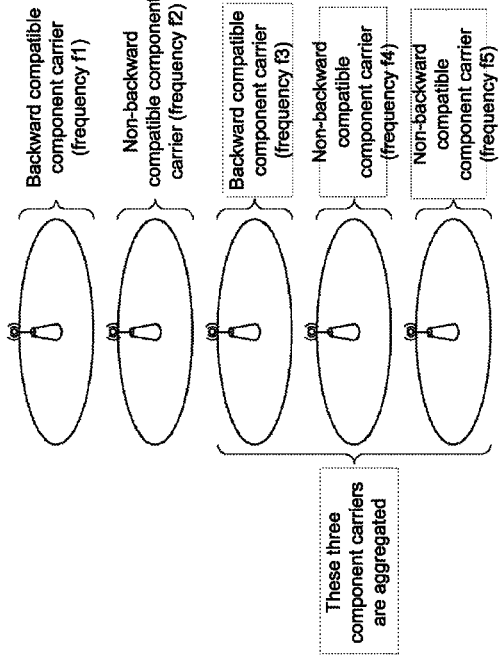

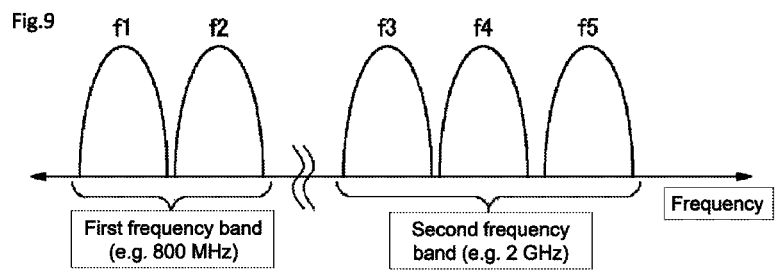
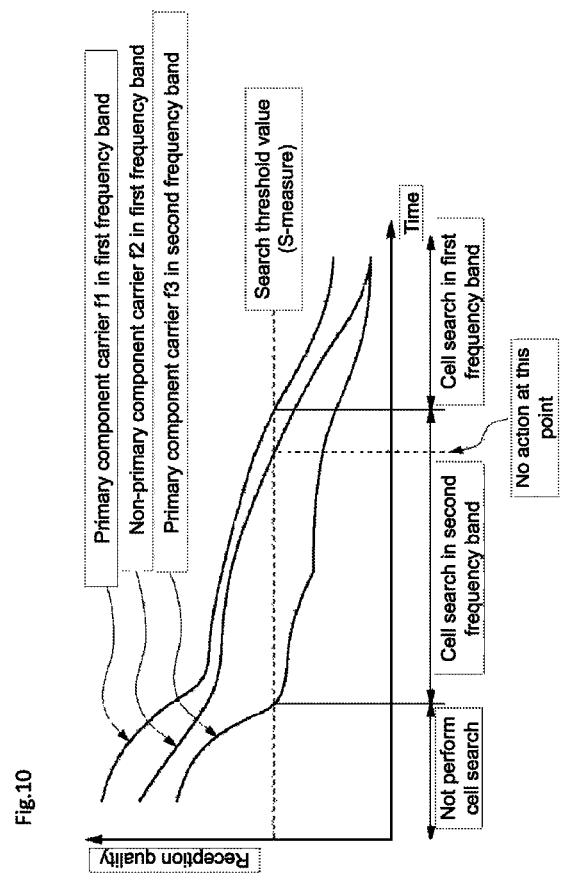

COMMUNICATION TERMINAL

RELATED APPLICATIONS

This application claims the benefits of Japanese Patent Application No. 2009-147778 filed on Jun. 22, 2009 in Japan, the contents of which are incorporated herein by reference.

TECHNICAL FIELD

The present invention relates to a communication terminal and a base station for controlling a communication terminal that support component carrier aggregation (also called just "carrier aggregation," "band aggregation," or "band bonding").

BACKGROUND ART

In a mobile communication system, a communication terminal searches for a neighboring cell and measures the reception quality of a radio wave from the detected neighboring cell (hereinafter referred to as "quality measurement") when there is a decline in the quality of communication with a cell it is currently connected to (hereinafter referred to as a "serving cell"). If a neighboring cell of better reception quality than the serving cell is found as a result, a network controller causes the communication terminal to perform a handover to the neighboring cell.

The search and quality measurement for a neighboring cell are major factors in terms of reducing the power consumption of a communication terminal. Basically, if a serving cell is of a sufficiently good quality, the communication terminal is presumed to have no need for performing the search and quality measurement for a neighboring cell, since a communication terminal only needs to be connected to a serving cell. A threshold value for determining whether or not to perform a neighboring cell search (this threshold value is called "S-measure" in LTE) is therefore specified (Non-patent document 3). This threshold value is herein called a "search threshold value."

FIG. 24 illustrates a search threshold value. As shown in FIG. 24, when the measured value of the reception quality of a serving cell is above a search threshold value, a neighboring cell search is not performed since the quality is good and a handover is presumed to be unnecessary. On the other hand, when the measured value of the reception quality of a serving cell is below a search threshold value, a neighboring cell search is performed since the quality is bad and a handover may be made. Consequently, a neighboring cell search is performed only when required, and the power consumption of a communication terminal can be reduced.

By the way, LTE-advanced is now being standardized by 3GPP so as to be a candidate for a wireless communication system adopted into IMT-advanced. In this LTE-advanced standardization, carrier aggregation, in which a plurality of component carriers are simultaneously assigned to a communication terminal, is under review for improvement in the throughput of a communication terminal.

FIG. 25 is a conceptual diagram illustrating carrier aggregation. In the example shown in FIG. 25, there are component carriers f1 to f3 of a bandwidth of 20 MHz. A communication terminal supporting carrier aggregation (e.g. a Rel-10 communication terminal) uses the component carriers f1 to f3 simultaneously to communicate with a bandwidth of 60 MHz.

On the other hand, a communication terminal which dose not support carrier aggregation (e.g. a Rel-819 communication terminal) connects to one of the component carriers f1 to f3 to communicate over 20 MHz.

Keeping the bandwidth unchanged as above allows previously released communication terminals (e.g. Rel-8/9) to be supported as well, and can improve the throughput of communication terminals to be newly released (e.g. Rel-10 communication terminals). This is one merit of carrier aggregation.

Note here that a communication terminal incompatible with carrier aggregation regards each circle of the carriers f1 to f3 shown in FIG. 25 as a cell. The cell is defined by 3GPP (Non-patent document 1). Further efficiency is now under study in consideration of implementing carrier aggregation. Scenarios for enhancing efficiency will be described below.

(Scenario 1)

FIG. 26 shows one scenario for further enhancing the efficiency of carrier aggregation. A component carrier f1 includes a synchronization channel, broadcast information, an L1 control channel, and the like, and can alone provide services to a communication terminal. Component carriers f2 and f3 do not include a synchronization channel nor broadcast information, and a communication terminal cannot detect those component carriers alone. This is because a communication terminal detects a component carrier (which is called "cell detection" in Rel-8) by receiving a synchronization channel in a cell search process.

A communication terminal cannot be on standby (which is called "camp on") nor establish a call on the component carriers f2 and f3. The standby and call establishment are allowed by receiving broadcast information (more specifically, Master Information Block (MIB), System Information Block 1 (SIB1), and System Information Block 2 (SIB2) in broadcast information) after cell detection. A communication terminal therefore cannot be on standby on the component carrier concerned unless there are both a synchronization channel and broadcast information.

In this scenario, a communication terminal in an idle state (RRC_IDLE) detects only the component carrier f1 and then begins to be on standby. After that, the communication terminal performs a call establishment process, comes into an active state (RRC_CONNECTED), and then adds the component carriers f2 and f3 in accordance with an instruction from the network side, to perform carrier aggregation. Since the communication terminal may require reception of broadcast information even after it comes into an active state, there may be an operation in which the communication terminal continues to use the component carrier f1 and uses the component carriers f2 and f3 just as additions. FIG. 27 shows one example of a process of adding the component carriers f2 and f3.

A communication terminal which does not support carrier aggregation (e.g. a Rel-8/9 communication terminal) will use only the component carrier f1 even after it comes into an active state.

(Scenario 2)

FIG. 28 shows another scenario for further enhancing the efficiency of carrier aggregation. A component carrier f1 includes a synchronization channel, broadcast information, an L1 control channel, and the like, and can alone provide services to a communication terminal. Component carriers f2 and f3 do not include an L1 control channel, and a communication terminal cannot detect those component carriers alone. This is because a communication terminal cannot determine which resource it should use when there is no L1 control channel, since it is notified of which resource it should use through an L1 control channel.

As with the previously described scenario, a communication terminal in an idle state cannot be on standby on the component carriers f2 and f3, and a communication terminal which does not support carrier aggregation (a Rel-8/9 communication terminal) also cannot use the component carriers f2 and f3.

In the above examples, the component carrier which can provide all services and to which a communication terminal must be connected at the very least (the component carrier f1 in FIGS. 26 and 28) is sometimes called a backward compatible component carrier. This is because it can sometimes support a communication terminal of Rel-8/9 and the like as well (Non-patent document 2). Conversely, component carriers other than the above are sometimes called non-backward compatible component carriers.

While the downlink and uplink are not particularly distinguished from each other in the above description, the description basically centers on downlink operation. The downlink and uplink correspond one-to-one with each other in LTE Rel-8.

FIG. 29 shows an "operation in LTE Rel-8." That is, when a frequency 1 used for the downlink and a frequency 4 used for the uplink are paired with each other and a communication terminal uses the frequency 1 to receive, it uses the frequency 4 to transmit. Similarly, frequencies 2 and 5, as well as frequencies 3 and 6, are paired with each other. The process in FIG. 27 is thus shown only for the downlink for the purpose of simplification though different component carriers are actually used for reception and for transmission.

FIG. 30 shows an example of possible carrier aggregation in which the downlink and uplink are asymmetric. There may also be such an asymmetric operation in future extensions. However, the invention can be applied to either case where the uplink and downlink are symmetric or asymmetric. The description below will center on downlink component carriers.

PRIOR ART DOCUMENTS

Non-Patent Documents

Non-patent document 1: 3GPP TR 21.905 V8.8.0
Non-patent document 2: R2-092866, "Synchronization channel and system information for carrier aggregation"
Non-patent document 3: 3GPP TS 36.331 V8.5.0
Non-patent document 4: 3GPP TS 36.321 V8.5.0
Non-patent document 5: 3GPP TS 36.101 V8.5.1

SUMMARY OF THE INVENTION

Problems to be Solved by the Invention

As described above, whether to perform a cell search and quality measurement or not is determined by using a search threshold value and, when carrier aggregation is performed, all component carriers comprising the carrier aggregation are regarded as serving cells. A plurality of serving cells thus exist, and therefore it is required to determine how to make a comparison to a search threshold value.

A purpose of the invention is to provide a communication terminal and a base station which are capable of determining a search threshold value for carrier aggregation to determine the timing of starting a cell search.

Means for Solving the Problems

A communication terminal of the invention is capable of simultaneously communicating through a plurality of carriers by carrier aggregation, and comprises: a quality measurement unit for measuring the reception quality of a radio wave transmitted through a plurality of carriers from a base station of a connected cell to obtain a measured value; a primary carrier storage unit storing information specifying a primary carrier chosen from the plurality of carriers; a comparator for comparing a measured value of the primary carrier measured by the quality measurement unit to a threshold value; and a cell search unit for searching for another cell when the measured value of the primary carrier is less than or equal to the threshold value.

Advantages of the Invention

The invention involves determining the timing of performing a cell search based on the reception quality of a primary carrier, and thereby allows even a communication terminal supporting carrier aggregation to appropriately start a cell search.

There are other aspects of the invention as described below. This disclosure of the invention therefore intends to provide part of the aspects of the invention and does not intend to limit the scope of the invention described and claimed herein.

BRIEF DESCRIPTION OF THE DRAWINGS

FIG. 3 shows an operation of the communication terminal of the first embodiment;
FIG. 4 shows a scenario example of carrier aggregation;
FIG. 9 illustrates frequency bands;
FIG. 10 shows the timing for a communication terminal according to a second embodiment to perform a cell search.

MODE OF EMBODYING THE INVENTION

The following is a detailed description of the invention. The embodiments described below are only examples of the invention, and the invention can be varied in various aspects. Therefore, the specific configurations and functions disclosed below do not limit the claims.

Now, a communication terminal and base station of embodiments of the invention will be described with reference to the drawings.

(First Embodiment)

Figure 1:
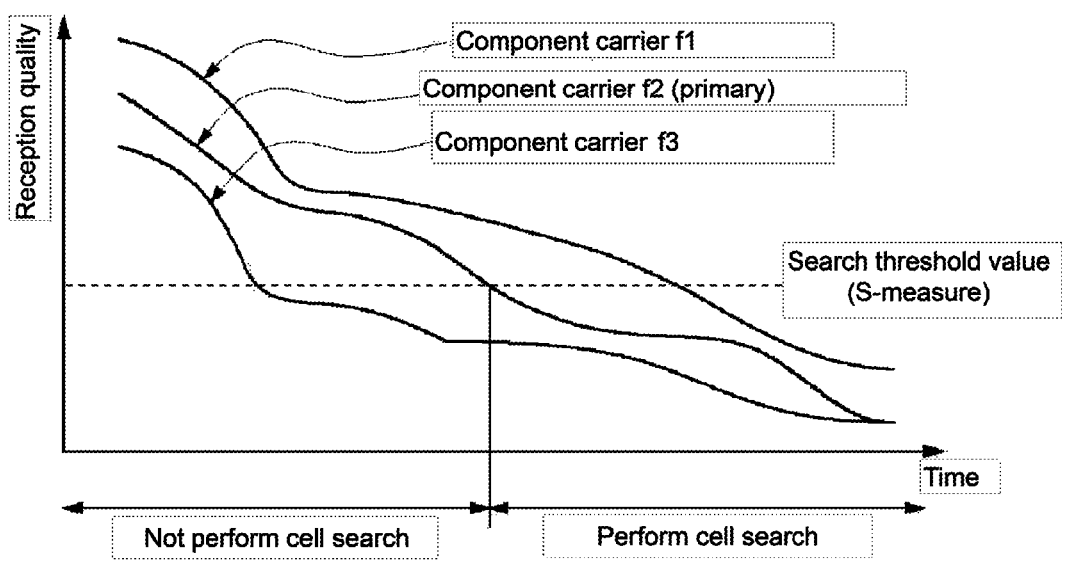
FIG. 1 shows the timing for a communication terminal according to a first embodiment to perform a cell search.

FIG. 1 shows the timing for a communication terminal 1 according to a first embodiment to perform a cell search. A primary component carrier is already determined among component carriers performing carrier aggregation. A component carrier f2 is the primary component carrier in the example shown in FIG. 1. The primary component carrier may be specified by a base station 30 or may be determined by the communication terminal 1 based on some kind of rule. The method of determination will be described later.

The communication terminal 1 compares a measured value of the reception quality of the primary component carrier to a search threshold value and, if the measured value of the primary component carrier is more than or equal to the search threshold value, determines a cell search to be unnecessary even if any measured value of other component carriers are below the search threshold value. Conversely, if the measured value of the primary component carrier is below the search threshold value, the communication terminal 1 determines a cell search to be required.

[Communication Terminal]

Figure 2:
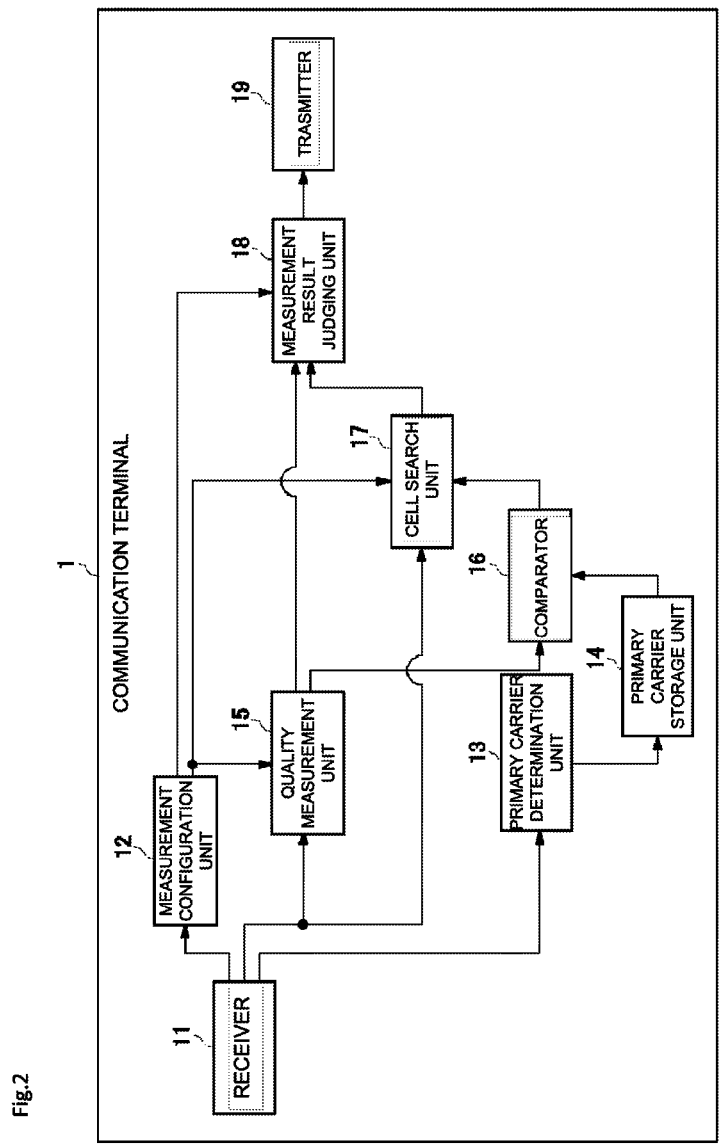
FIG. 2 shows a configuration of the communication terminal of the first embodiment.

FIG. 2 shows a configuration of the communication terminal 1 of the first embodiment. The communication terminal 1 has a receiver 11, a measurement configuration unit 12, a primary carrier determination unit 13, a primary carrier storage unit 14, a quality measurement unit 15, a comparator 16, a cell search unit 17, a measurement result judging unit 18, and a transmitter 19.

The receiver 11 receives a signal transmitted from the base station 30. From among the received information, the receiver 11 sends information on measurement (a measurement configuration) to the measurement configuration unit 12 and sends information for determining a primary frequency to the primary carrier determination unit 13. The receiver 11 also sends a signal for measurement transmitted from the base station 30 separately to the quality measurement unit 15 and cell search unit 17.

The measurement configuration unit 12 processes the information on measurement sent from the receiver 11 and configures therewith the quality measurement unit 15, the comparator 16, the cell search unit 17, and the measurement result judging unit 18. Specific examples of the information to be processed here include measConfig of IE (Information Elements) in an RRC Connection Reconfiguration message provided in Non-patent document 3. MeasConfig includes a frequency/cell to be measured (which is called and hereinafter referred to as a "measurement object"), information on how to report a measurement result to the base station 30 (which is called and hereinafter referred to as a "reporting configuration"), information on how to measure (which is called a "quantity configuration" and is hereinafter referred to as a "measurement configuration"), a search threshold value, and the like.

The measurement configuration unit 12 also notifies the quality measurement unit 15 and cell search unit 17 of a measurement object, a measurement configuration, and the like, notifies the measurement result judging unit 18 of a reporting configuration and the like, and notifies the comparator 16 of the search threshold value mentioned above.

The primary carrier determination unit 13 determines which one of a plurality of carrier-aggregated component carriers is to be used as a primary component carrier for a comparison to the search threshold value. The method of determining a primary component carrier will be described later in detail. The primary carrier determination unit 13 stores the result of primary component carrier determination in the primary carrier storage unit 14.

The quality measurement unit 15 performs measurement on a currently connected component carrier as configured by the measurement configuration unit 12. The quality measurement unit 15 sends the measurement result to the comparator 16 and the measurement result judging unit 18.

The comparator 16 reads the information on a primary carrier from the primary carrier storage unit 14 to specify a primary component carrier. The comparator 16 then compares the quality measurement result for the primary component carrier to the search threshold value passed from the measurement configuration unit 12 and determines whether or not to start a cell search. The comparator 16 notifies the cell search unit 17 of the judgment result.

When a cell search is determined to be performed by the comparison result received from the comparator 16, the cell search unit 17 performs a cell search according to the details configured by the measurement configuration unit 12 and performs quality measurement for a detected cell. The cell search unit 17 sends the measurement result to the measurement result judging unit 18.

The measurement result judging unit 18 compares the measurement results received from the quality measurement unit 15 and cell search unit 17 and, based on the measurement configuration configured by the measurement configuration unit 12, determines whether a report to the base station 30 is to be made or not. If the reporting is determined to be made, the measurement result judging unit 18 creates a Measurement Report message and sends it to the transmitter 19. The transmitter 19 transmits the Measurement Report message passed from the measurement result judging unit 18 to the base station 30.

FIG. 3 shows a flowchart showing an operation of the communication terminal 1 of the embodiment. The measurement configuration unit 12 of the communication terminal 1 receives a measurement configuration transmitted from the base station 30, and passes configuration values in the received measurement configuration information on to the quality measurement unit 15, comparator 16, cell search unit 17, and measurement result judging unit 18 to configure them with the configuration values (S10).

The primary carrier determination unit 13 of the communication terminal 1 then determines a primary component carrier to be compared to a search threshold value (S12). The primary carrier determination unit 13 receives information on the primary component carrier from the base station 30, and determines the received component carrier to be a primary. The primary carrier determination unit 13 stores information on the determined primary carrier in the primary carrier storage unit 14.

The comparator 16 of the communication terminal 1 then judges whether a measured value of the reception quality of the primary component carrier is more than or equal to the search threshold value or not (S14). The comparator 16 receives information on the measured value of the reception quality of the primary component carrier from the quality measurement unit 15. If the measured value of the primary component carrier is more than or equal to the search threshold value (Yes at S14), the communication terminal 1 does not perform a cell search but monitors the measured value of the primary component carrier until it falls below the search threshold value.

If the measured value of the primary component carrier is below the search threshold value (No at S14), the communication terminal 1 starts a cell search (S16). If the communication terminal 1 detects a neighboring cell, it performs quality measurement for the detected cell.

Figure 26:
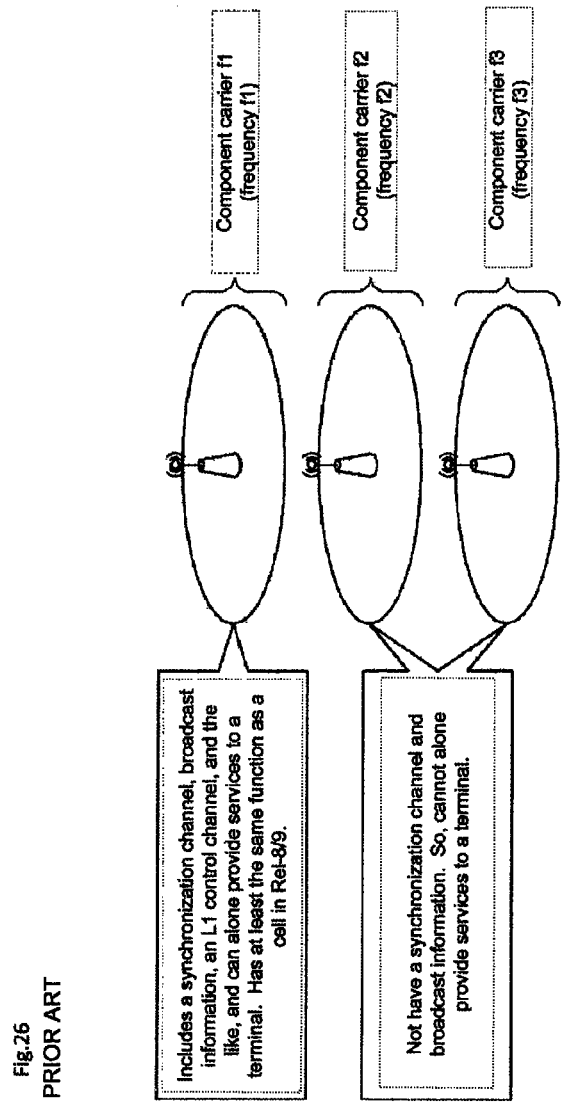
FIG. 26 shows one scenario for further enhancing the efficiency of carrier aggregation.
Figure 27:
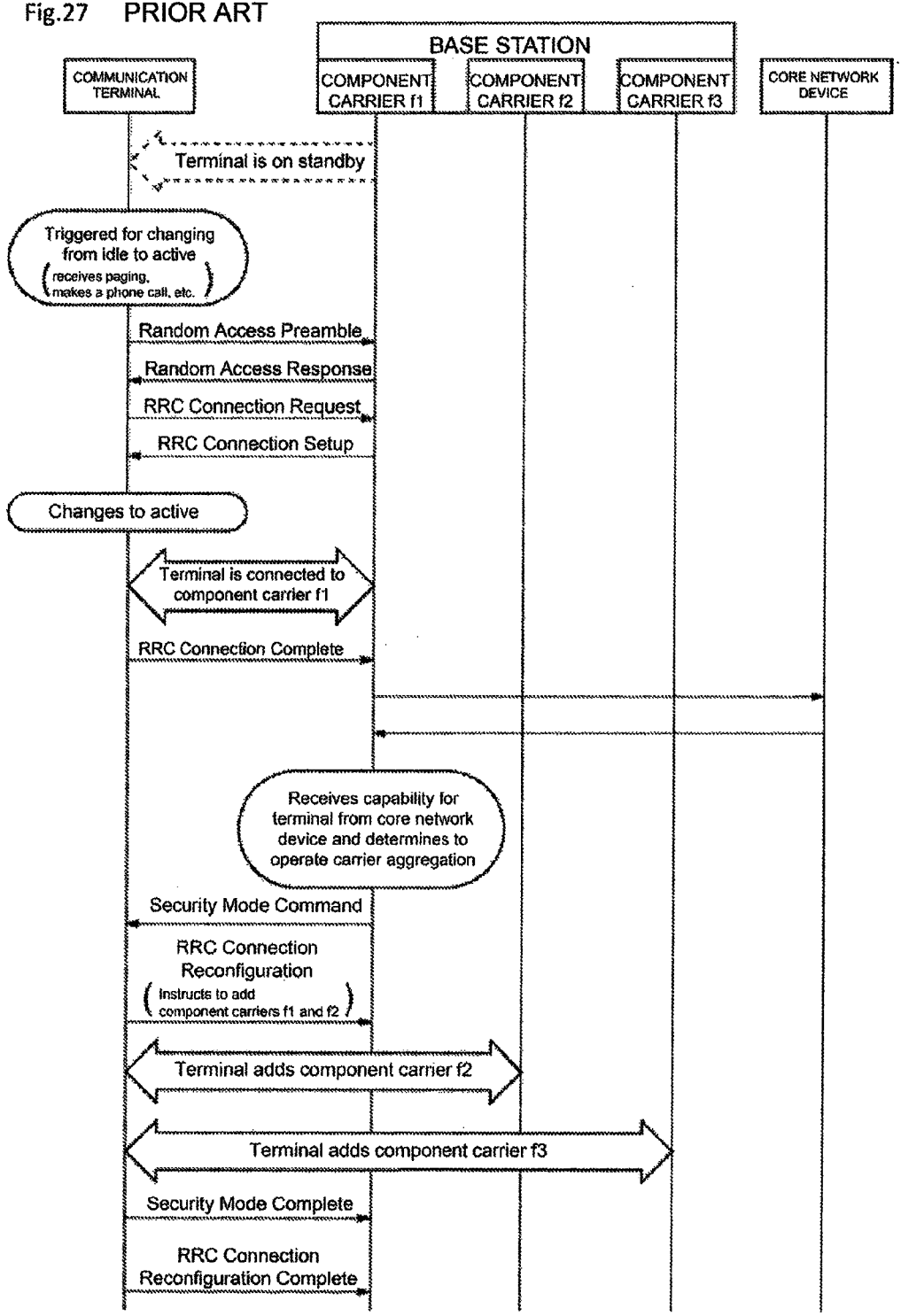
FIG. 27 shows a process of adding component carriers.
Figure 28:
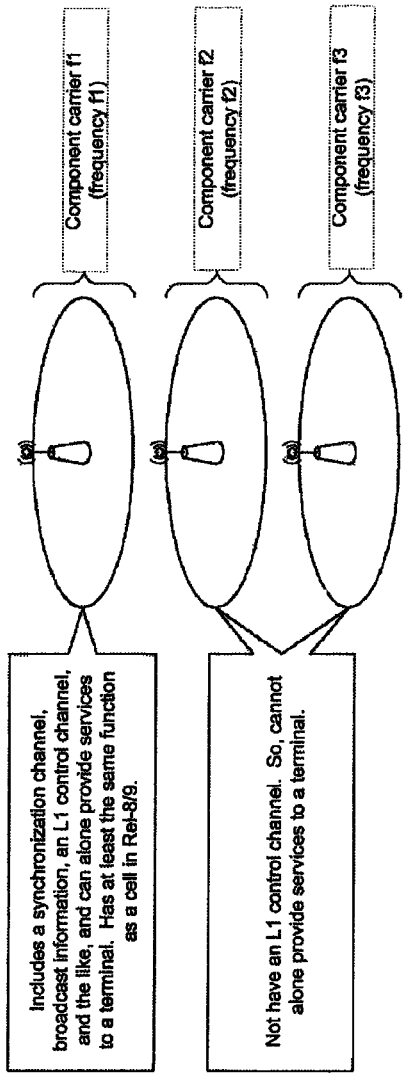
FIG. 28 shows another scenario for further enhancing the efficiency of carrier aggregation.
Figure 29:
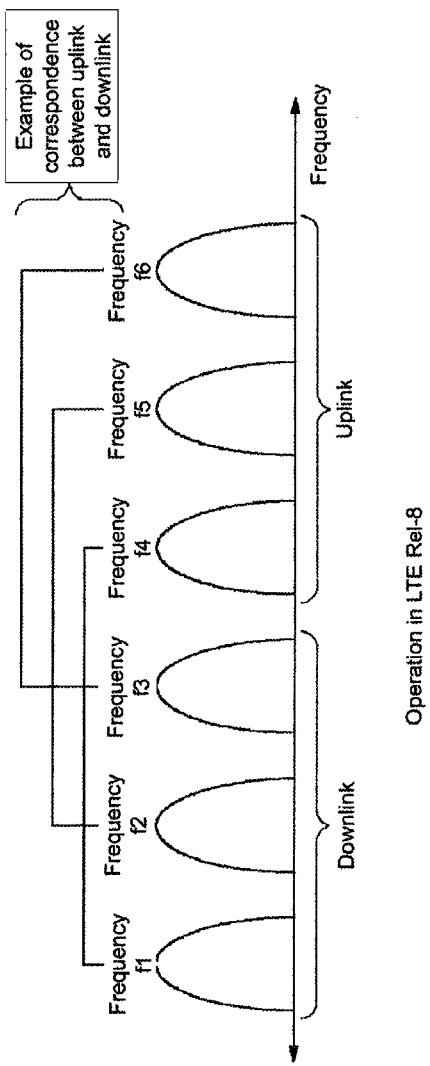
FIG. 29 shows an operation in LTE Rel-8.
Figure 30:
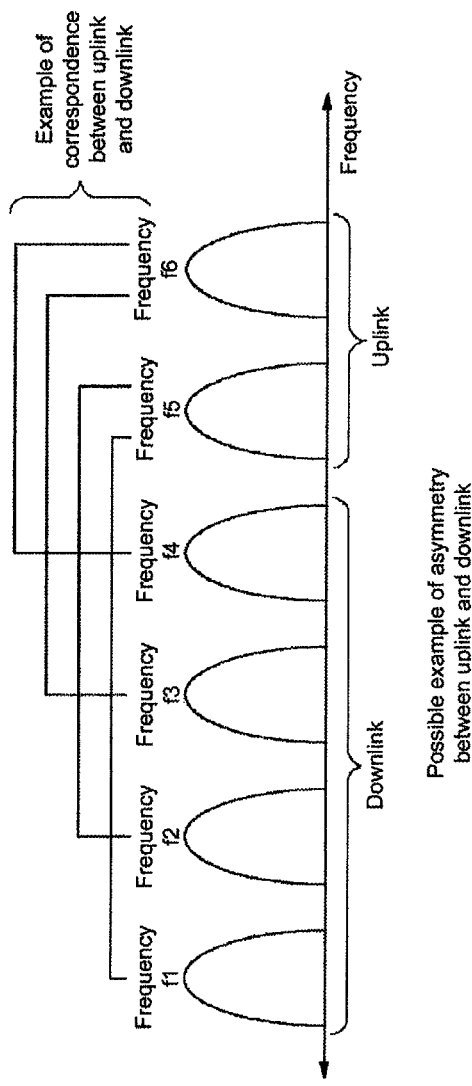
FIG. 30 shows an example of possible carrier aggregation in which the downlink and uplink are asymmetric.

How to determine a primary component carrier will be described below. As described above with the help of FIGS. 26 and 28, there are a backward compatible component carrier, which can alone provide services, and other component carriers in a carrier aggregation operation. The communication terminal 1 needs to receive broadcast information and an L1 control channel, and therefore a good reception quality requires to be always kept on a backward compatible carrier. For that reason, a backward compatible carrier may be set as a primary component carrier.

FIG. 4 shows a scenario example of carrier aggregation. In such a case where there is only one backward compatible component carrier (f3 in this example) when the communication terminal 1 performs carrier aggregation, the component carrier is handled as a primary component carrier and is used for a comparison to the search threshold value.

Figure 5:
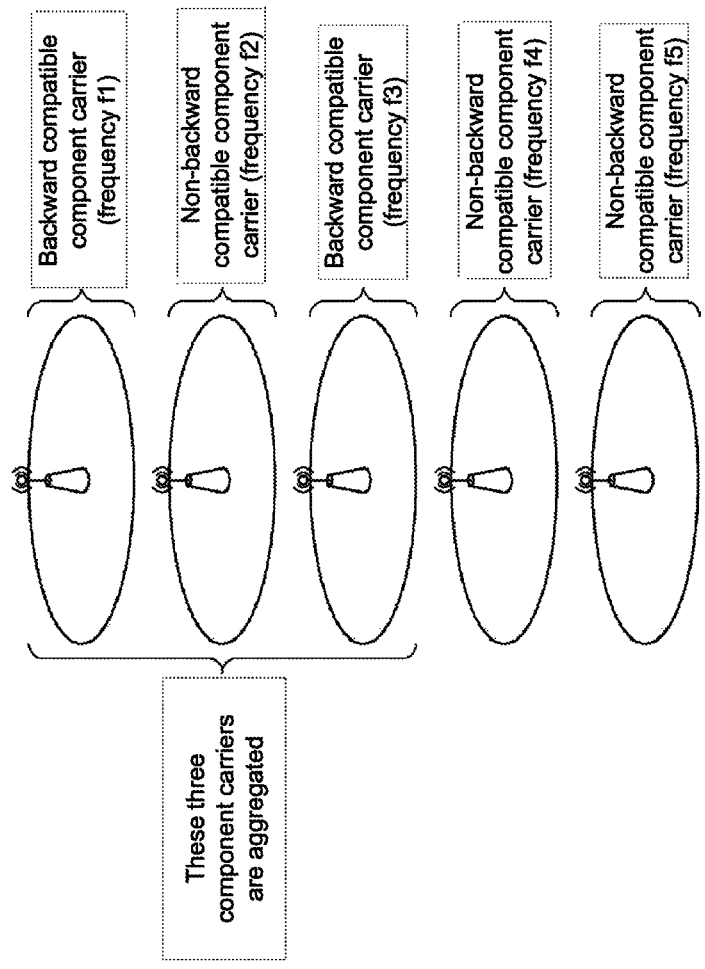
FIG. 5 shows another scenario example of carrier aggregation.

FIG. 5 shows another scenario example of carrier aggregation. In this example, a plurality of backward compatible component carriers f1 and f3 are assigned to the communication terminal 1. One of the two backward compatible component carriers is used as a primary component carrier in this case.

Figure 6:
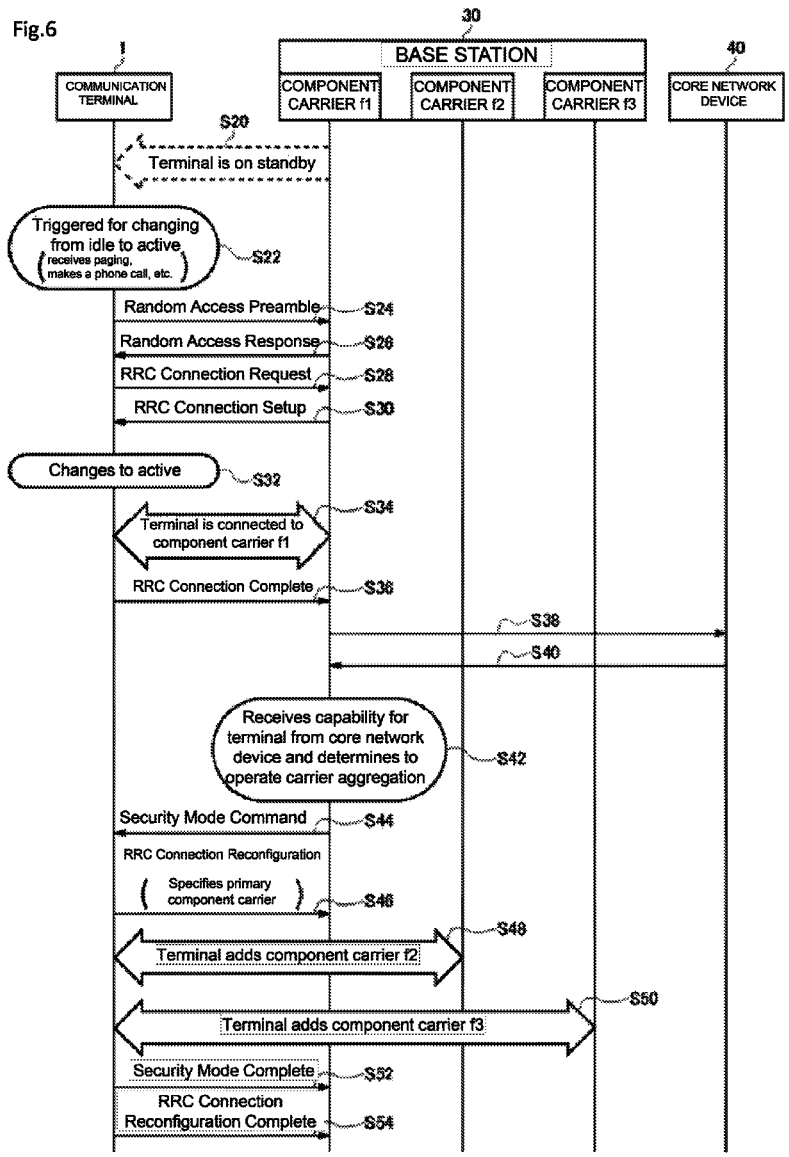
FIG. 6 shows a process of specifying a primary component carrier.

FIG. 6 shows a process of specifying a primary component carrier. At the beginning, the communication terminal 1 camps on a component carrier f1 and is on standby (S20). When a trigger for changing from an idle state to an active state is activated by the communication terminal 1 receiving paging or making a phone call (S22), the communication terminal 1 uses the component carrier f1 to transmit Random Access Preamble to the base station 30 (S24). Receiving this, the base station 30 transmits Random Access Response to the communication terminal 1 (S26).

The communication terminal 1 then transmits an RRC Connection Request message to the base station 30 (S28), which upon receiving this transmits an RRC Connection Setup message to the communication terminal 1 (S30). This causes the communication terminal 1 to change from an idle state to an active state (S32) and connect to the component carrier f1 (S34).

Subsequently, the communication terminal 1 transmits an RRC Connection Complete message to the base station 30 (S36), which transfers the RRC Connection Complete message to its core network (S38). Receiving this, the core network device 40 transmits to the base station 30 capability information including information on whether the communication terminal 1 can perform carrier aggregation or not (S40). Receiving the capability information for the communication terminal 1, the base station 30 determines to operate carrier aggregation (S42).

If the base station 30 determines to perform carrier aggregation, it transmits to the communication terminal 1 a Security Mode Command (S44) and, subsequently, an RRC Connection Reconfiguration message (S46). The RRC Connection Reconfiguration message transmitted here includes an instruction to add component carriers f2 and f3 and an instruction to specify a primary component carrier.

Receiving the RRC Connection Reconfiguration message, the communication terminal 1 adds the component carriers f2 and f3 (S48 and S50), and transmits Security Mode Complete to the base station 30 (S52). Subsequently, the communication terminal 1 transmits an RRC Connection Reconfiguration Complete message (S54).

While an example where a primary component carrier is explicitly specified is shown in FIG. 6, a primary component carrier may also be determined from other information. For example, the communication terminal 1 is at the beginning connected to the component carrier f1 in the example shown in FIG. 6 and, in such a case, the component carrier f1 may be handled as a primary unless otherwise specified.

Figure 7:
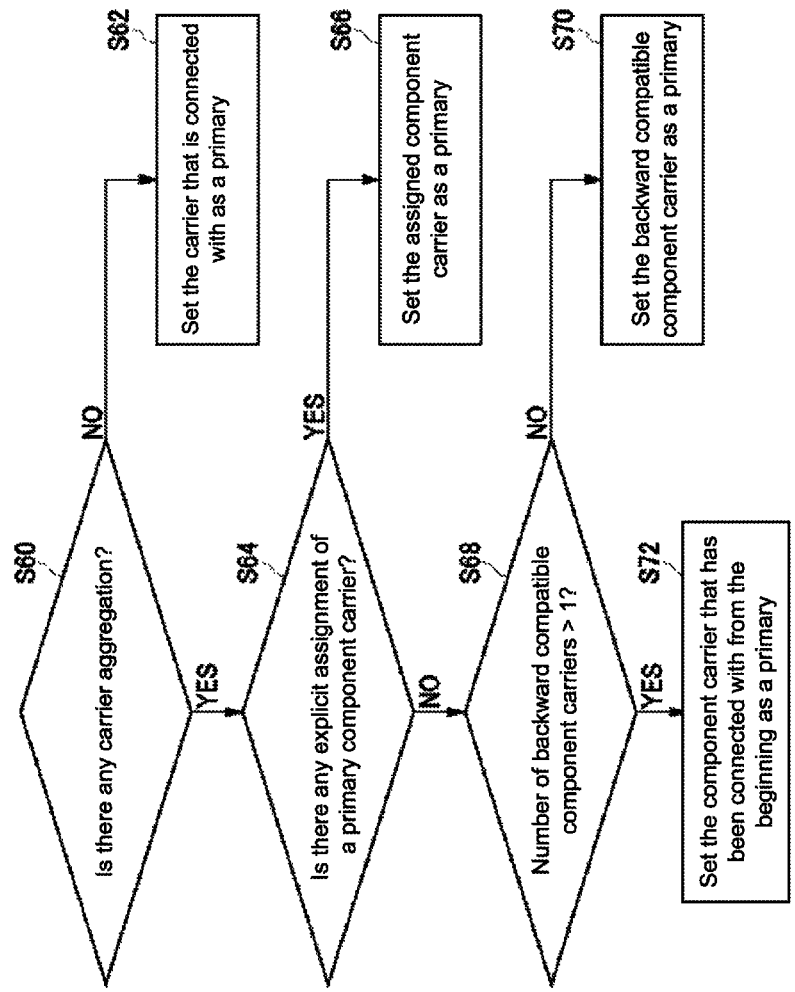
FIG. 7 shows another operation of a communication terminal to determine a primary component carrier.

FIG. 7 shows a flowchart of the above-described operation of the communication terminal 1 determining a primary component carrier. First, the communication terminal 1 judges whether there is carrier aggregation or not (S60). If there is no carrier aggregation (No at S60), there is only one component carrier, and therefore the communication terminal 1 sets the carrier that it uses for connection as a primary (S62).

If there is carrier aggregation (Yes at S60), the communication terminal 1 judges whether there is explicit assignment of a primary component carrier or not (S64). If there is explicit assignment (Yes at S64), the communication terminal 1 sets the explicitly assigned component carrier as a primary (S66).

If there is no explicit assignment (No at S64), the communication terminal 1 judges whether the carrier-aggregated carriers include more than one backward compatible carriers or not (S68). If there is only one backward compatible carrier (No at S68), the communication terminal 1 sets the backward compatible carrier as a primary carrier (S70). If there is a plurality of backward compatible carriers (Yes at S68), the communication terminal 1 sets the component carrier that it has been connected to from the beginning as a primary (S72).

[Base Station]

Figure 8:
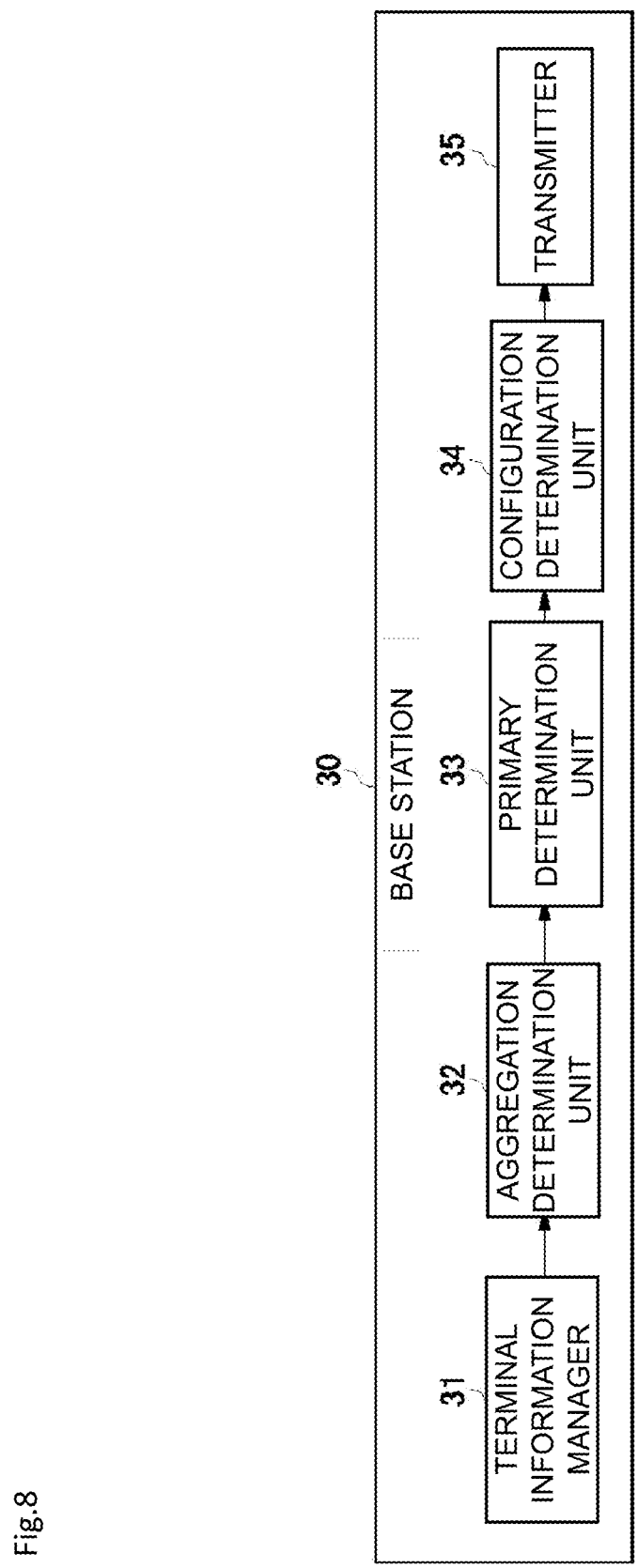
FIG. 8 shows a configuration of a base station.

FIG. 8 shows a configuration of the base station 30 of the embodiment. The base station 30 of the embodiment has a function to specify a primary component carrier for the communication terminal 1. The base station 30 has a terminal information manager 31, an aggregation determination unit 32, a primary determination unit 33, a configuration determination unit 34, and a transmitter 35.

The terminal information manager 31 manages a channel configuration, capability, and the like of the communication terminal 1. The terminal information manager 31 sends these pieces of information to the aggregation determination unit 32.

The aggregation determination unit 32 determines whether the communication terminal 1 performs carrier aggregation or not, determines on which component carriers the aggregation is to be performed if carrier aggregation is to be performed, and sends the result to the primary determination unit 33.

The primary determination unit 33 determines a primary component carrier, and sends information on the determined primary component carrier and the information received from the aggregation determination unit 32 both to the configuration determination unit 34.

The configuration determination unit 34 creates a message for instructing the communication terminal 1 which component carrier is to be a primary, and sends the message to the transmitter 35. Note here that the instruction on a primary component carrier will be omitted if, in the setting process of the primary component carrier of the communication terminal 1 shown in FIG. 7, the communication terminal 1 selects a component carrier that is desired by the base station 30 to be a primary without any instruction from the base station 30. The transmitter 35 transmits the message created by the configuration determination unit 34 to the communication terminal 1. This is a description of configurations and operations of the communication terminal 1 and base station 30 of the first embodiment.

Since the communication terminal 1 of the embodiment determines the timing of performing a cell search based on the reception quality of a primary carrier, it can appropriately start a cell search even when carrier aggregation is performed with a plurality of component carriers.

Since the base station 30 of the embodiment transmits information indicating a primary component carrier to the communication terminal 1, the communication terminal 1 can use an appropriate component carrier to make a judgment on a cell search.

While the above description is of how to determine a primary component carrier, a primary component carrier may be determined by methods other than the above.

For example, a measurement object in a measurement configuration is to be used to set a frequency/cell to be measured. If only one component carrier is specified here as a frequency to be measured, the frequency can be determined to be a primary component carrier. Conversely, there may also be a configuration in which a component carrier that was a primary is excluded from being a measurement object. In such a case, the component carrier concerned may cease to be a primary and another backward compatible component carrier may be set as a primary. In this case, if there are a plurality of other backward compatible component carriers, a primary component carrier is determined in accordance with an instruction from the base station 30.

Instead of receiving an instruction from the base station 30, the communication terminal 1 may control dynamically in such a manner that it makes the highest-performing component carrier a primary or it makes the lowest-performing component carrier a primary. The judgment of good or bad performance here may be made by using a measurement result used for a Measurement Report message or by using as another choice an instantaneous measurement result used for CQI reporting.

The component carrier most used for reception among carrier-aggregated component carriers may be set as a primary.

The handling as a primary component carrier may be applied not only to the comparison to the search threshold value but also to the reporting of a Measurement Report message. Since a Measurement Report message will constantly report the quality of a serving cell, a primary component carrier determined in the embodiment may be used as the component carrier to be reported then.

Discontinuous Reception (DRX), which is performed by the communication terminal 1, may also be considered. During carrier aggregation, DRX is not similarly performed on all component carriers but may be operated for each component carrier. Specifically, for example, DRX is performed only on a component carrier that is not used a lot, and is not performed on a frequently-used component carrier. In such a case where the DRX operation differs from one component carrier to another, there may be an operation in which a component carrier that DRX is performed on is not set as a primary component carrier. Conversely, a component carrier set as a primary may start DRX on condition that all the other component carriers start DRX. As a result, even when a component carrier set as a primary has not been used for a while, the component carrier set as a primary will not start DRX as long as another component carrier has been used. A component carrier set as a primary is presumed to have a good or stable quality for its communication terminal or as a system, and it is desirable that a component carrier set as a primary be used as much as possible and that DRX be performed thereon less frequently than on the other component carriers. The above-described operation allows a component carrier set as a primary to be kept in a state where it can be used at all times even if communication cannot be established with a certain communication terminal by using the component carrier set as a primary when the component carrier set as a primary is under high load.

(Second Embodiment)

A communication terminal 2 of a second embodiment will be described below. The communication terminal 2 of the second embodiment is different from that of the first embodiment in that it controls the operation for each frequency band.

FIG. 9 illustrates frequency bands. FIG. 9 shows carriers f1 to f5 as candidates for component carriers. A plurality of carriers of the carriers f1 to f5 are used to perform carrier aggregation. Note here that the carriers f1 and f2 are included in a first frequency band (e.g. 800 MHz band) and the carriers f3 to f5 are included in a second frequency band (e.g. 2 GHz band). In an operation like this, it is desirable to control the operation for each frequency band since there may be a backward compatible carrier in each frequency band and measurement results may differ considerably from one frequency band to another. In the embodiment, a primary component carrier is selected for each frequency band.

FIG. 10 shows the timing for the communication terminal 2 according to the second embodiment to perform a cell search. This is an example where carrier aggregation is performed by using, as component carriers, the carriers f1 to f3 of the carriers f1 to f5 shown in FIG. 9. The component carrier f1 of the component carriers f1 and f2 included in the first frequency band is a primary. Since the second frequency band includes only the component carrier f3, this is a primary.

As shown in FIG. 10, a cell search is not performed if the quality is above the search threshold value for all the primary component carriers (the component carriers f1 and f3 in this example). A cell search is started for the second frequency band when the quality of the primary of the second frequency band, the component carrier f3, falls below the search threshold value. Specifically, the search process is performed only for f3 if only f3 is in the measurement configuration for the second frequency band or, if there is any carrier other than f3 (e.g. f4 shown in FIG. 9) in the configuration and if the communication terminal 2 can perform the measurement for the other frequency (i.e. f4) while keeping the connection to the component carrier it is connected to, the search process is performed for f4 as well as for f3. Since the quality of the component carrier f1 is above the search threshold value at this point in time, a cell search is not performed on the component carriers included in the first frequency band.

The process is the same (that is, a cell search is not performed) even if the quality of the component carrier f2, which is not the primary of the first frequency band, falls below the search threshold value. A cell search is performed on all the component carriers in the configuration for the communication terminal 2 including the first frequency band only when the quality of the primary of the first frequency band, the component carrier f1, falls below the search threshold value.

Figure 11:
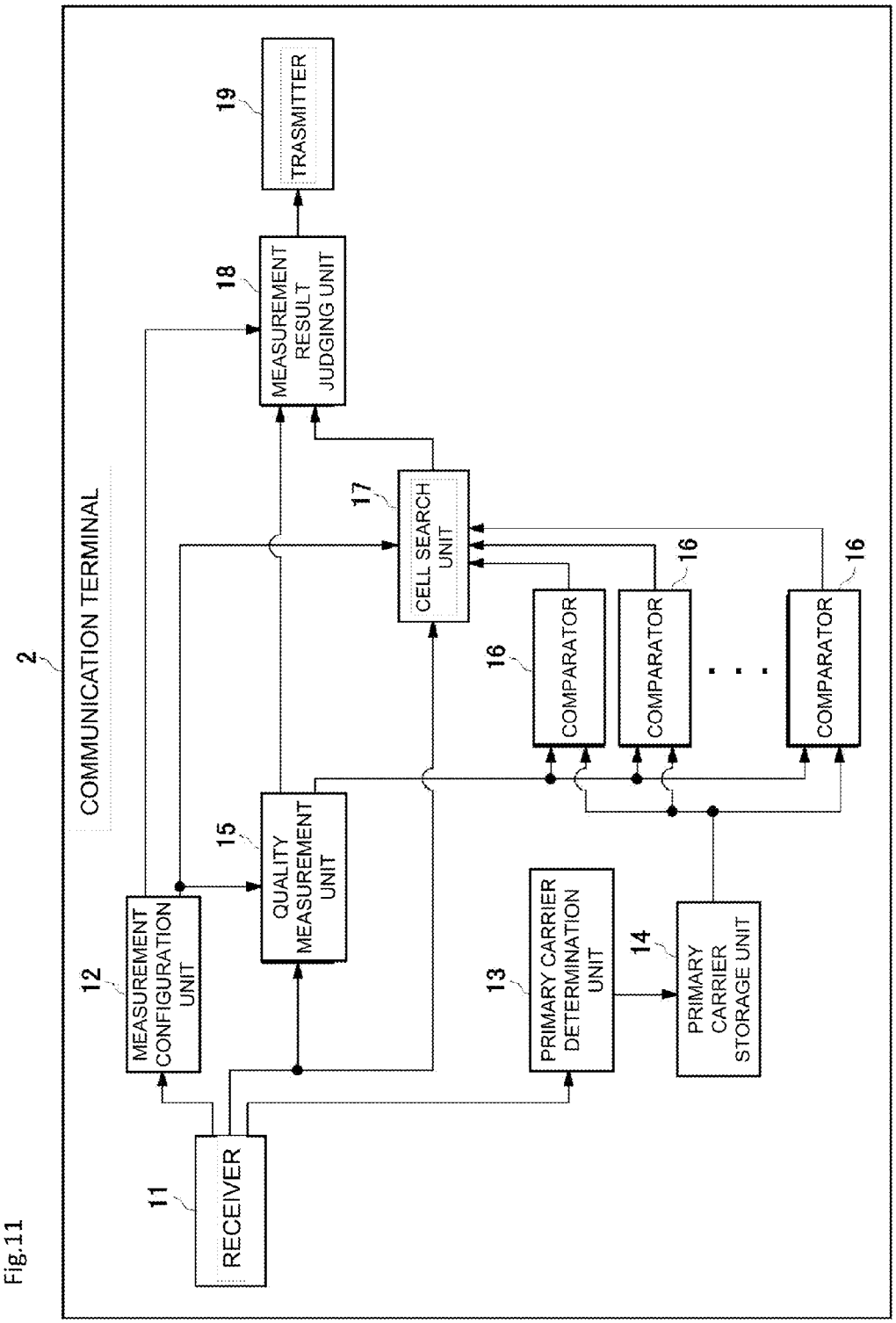
FIG. 11 shows a configuration of the communication terminal of the second embodiment.

FIG. 11 shows a configuration of the communication terminal 2 of the second embodiment. The configuration of the communication terminal 2 of the second embodiment is basically the same as that of the first embodiment, but is different therefrom in that it has a plurality of comparators 16. A description will be given below of the configuration of the communication terminal 2 of the second embodiment, centering on differences with the first embodiment.

The primary carrier determination unit 13 determines a primary component carrier for each frequency band. The primary carrier determination unit 13 notifies the comparator 16 for each frequency band of information on the determined primary component carrier.

The quality measurement unit 15 notifies the plurality of comparators 16 of quality measurement results. The cell search unit 17 does not start a cell search for all at once, but controls the start of a cell search for each frequency band in accordance with instructions from the plurality of comparators 16.

Each of the plurality of comparators 16 compares the primary component carrier of the corresponding frequency band to the search threshold value. Upon receiving the reception quality of the primary component carrier of the corresponding frequency band from the quality measurement unit 15, each of the plurality of comparators 16 compares the reception quality to the search threshold value and notifies the cell search unit 17 of the comparison result.

Figure 12:
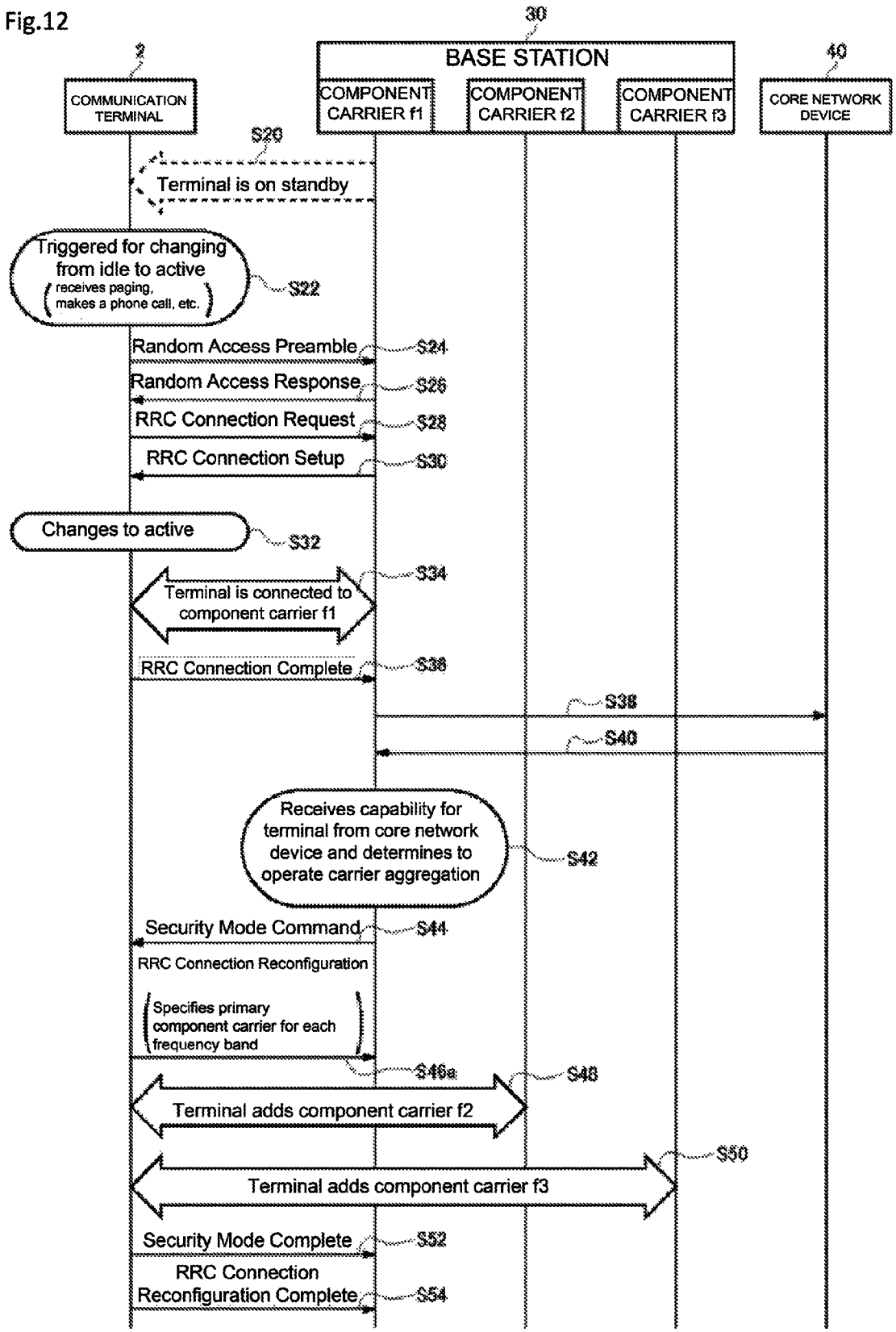
FIG. 12 shows a process of specifying a primary component carrier.

FIG. 12 shows a process of specifying a primary component carrier in the second embodiment. The details of the process are basically the same as those in the first embodiment shown in FIG. 6, but are different therefrom in that a primary component carrier is specified in RRC Connection Reconfiguration message (S46a) for each frequency band.

Figure 13:
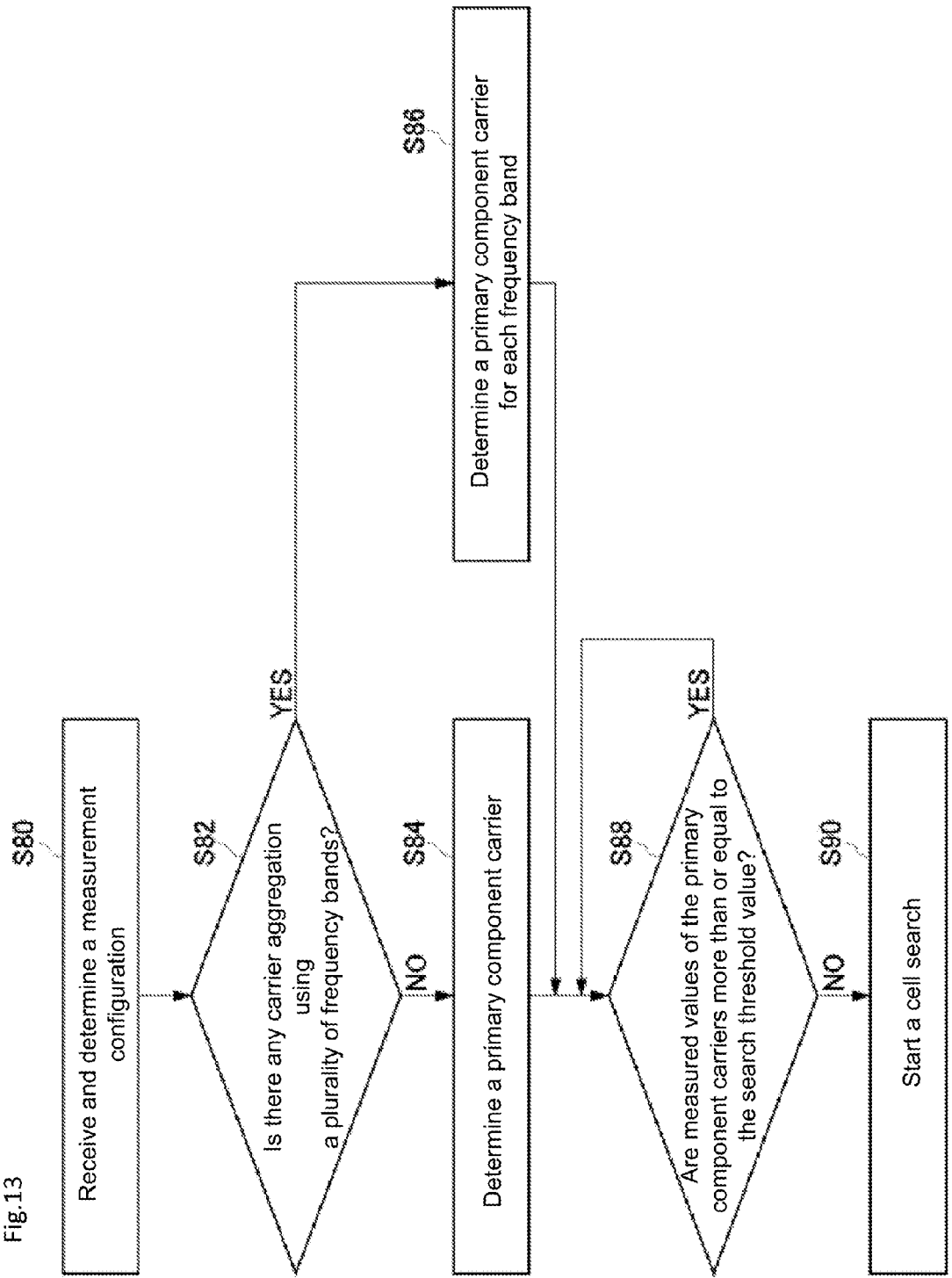
FIG. 13 shows an operation of the communication terminal of the second embodiment.

FIG. 13 is a flowchart showing an operation of the communication terminal 2. The communication terminal 2 receives information on a measurement (a measurement configuration) transmitted from the base station 30, and determines the measurement configuration by means of the measurement configuration unit 12 (S80). The communication terminal 2 then judges whether a plurality of frequency bands are used in carrier aggregation or not (S82). If a plurality of frequency bands are judged not to be used (No at S82), the communication terminal 2 determines a primary component carrier (S84). The method described in the first embodiment can be used for this.

If a plurality of frequency bands are judged to be used (Yes at S82), the communication terminal 2 determines a primary component carrier for each frequency band (S86).

The comparators 16 of the communication terminal 2 then judge whether the quality of the primary component carriers is more than or equal to the search threshold value or not (S88). If the quality of the primary component carriers is more than or equal to the search threshold value (Yes at S88), the communication terminal 2 does not perform a cell search but monitors the quality of the primary component carriers until it falls below the search threshold value. If the quality of any primary component carrier is not more than or equal to the search threshold value (No at S88), the communication terminal 2 starts a cell search for the frequency band including the component carrier that is below the search threshold value (S90).

The base station 30 of the second embodiment will be described below. The configuration of the base station 30 of the second embodiment is basically the same as that of the first embodiment (see FIG. 8). However, the base station 30 of the second embodiment determines a primary component carrier for each frequency band by means of the primary determination unit 33 and transmits them from the transmitter 35.

Groups divided according to frequency bands in the embodiment will be described in detail here. These groups include a bundle of neighboring component carriers. Specifically, component carriers can be grouped depending on frequency bands according to (1) to (3) given below. The methods shown below do not contradict each other, and can be combined in any way.

(1) As shown in Chapter 5.7.3 of Non-patent document 5, corresponding frequencies are defined in LTE. In this case, frequencies bundled together as E-UTRA Operating Band may be regarded as a group of the same frequency band.

(2) The base station 30 may determine groups of the same frequency bands in accordance with the system operation. In this case, the base station 30 notifies the communication terminal 2 of the range of frequency bands of the same groups. This notification may be transmitted through broadcast information or through messages specific to communication terminals.

(3) A rule may be made according to which only a certain frequency band is regarded as the same group. Specifically, for example, with a 100 MHz band being defined in advance (e.g. 95-105 MHz), those included in this band are regarded as being in the same frequency band and those not included in this band are regarded as being in another frequency band.

When carrier aggregation is performed by using different frequency bands, the communication terminal 2 of the embodiment can control a cell search in consideration of differences in reception quality caused by the difference of frequency band. This can reduce power consumption of communication terminals.

The embodiment has been shown with an example in which a common value is set as the search threshold value regardless of frequency band. However, search threshold values different from one group to another depending on frequency band may be set.

The start of a cell search is in the embodiment controlled for each frequency band. However, a cell search may be performed on all component carriers if any of the primary component carriers falls below the search threshold value. Conversely, there may be an operation in which a cell search is not started until all the primary component carriers fall below the search threshold value.

(Third Embodiment)

A communication terminal 3 of a third embodiment will be described below. The communication terminal 3 of the third embodiment, unlike the second embodiment, performs a cell search not only on carrier-aggregated component carriers but also on non-carrier-aggregated carriers when a primary component carrier falls below the search threshold value. The configuration of the base station 30 of the third embodiment is the same as that of the second embodiment.

Figure 14:
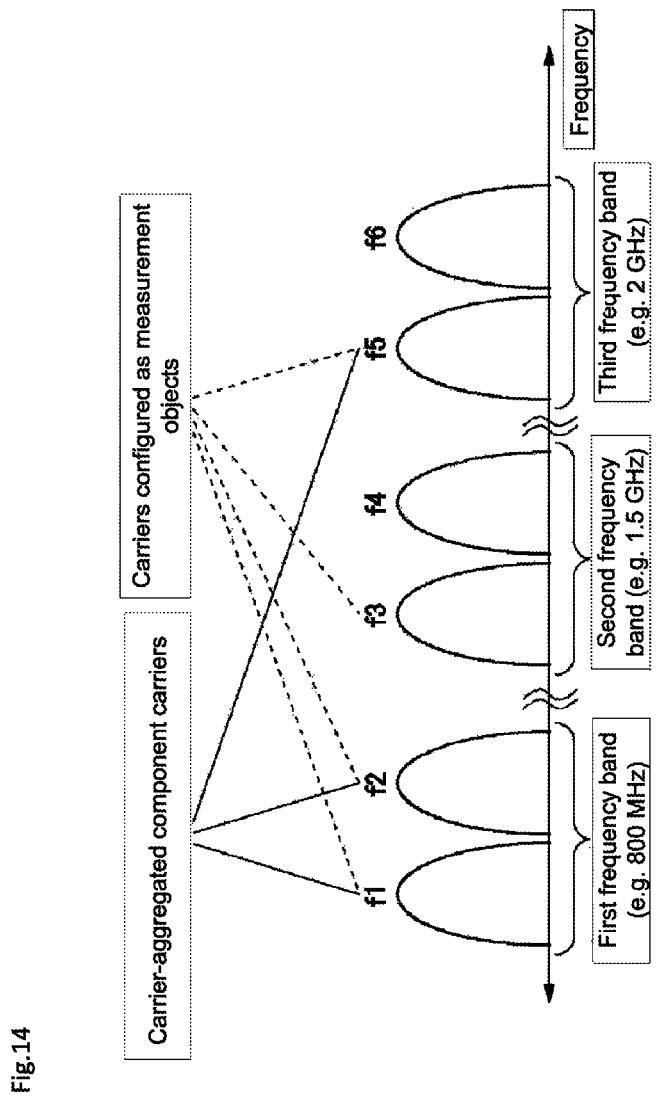
FIG. 14 shows an example of carrier-aggregated frequency bands and frequency bands to be measured.

FIG. 14 shows an example of carrier-aggregated frequency bands and frequency bands to be measured. As shown in FIG. 14, a carrier aggregation is configured with component carriers f1, f2, and f5, and a measurement object is configured with the component carriers f1, f2, and f5, in addition to a component carrier f3.

In this case, since the component carriers f1, f2, and f5 are currently connected component carriers, the communication terminal 3 can perform a cell search and a quality measurement on the same component carriers f1, f2, and f5 for a neighboring cell at the same time on the component carriers f1, f2, and f5 for the connected cell. However, the component carrier f3 is not currently included in the carrier aggregation. For example, in a case where the communication terminal 3 can be connect to only three component carriers at the same time, that is, where the number of component carriers with which the communication terminal 3 can perform carrier aggregation, the capability, is three, a cell search and quality measurement cannot be performed on the component carrier f3 unless the communication with any one of the component carriers f1, f2, and f5 is interrupted.

Generally, this interruption process cannot be performed unless gap configuration is performed in which the base station 30 explicitly provides the timing of gaps for the communication terminal 3. The embodiment allows a cell search to be performed on a component carrier that is not in a band aggregation like the component carrier f3, without an instruction from the base station 30.

Figure 15:
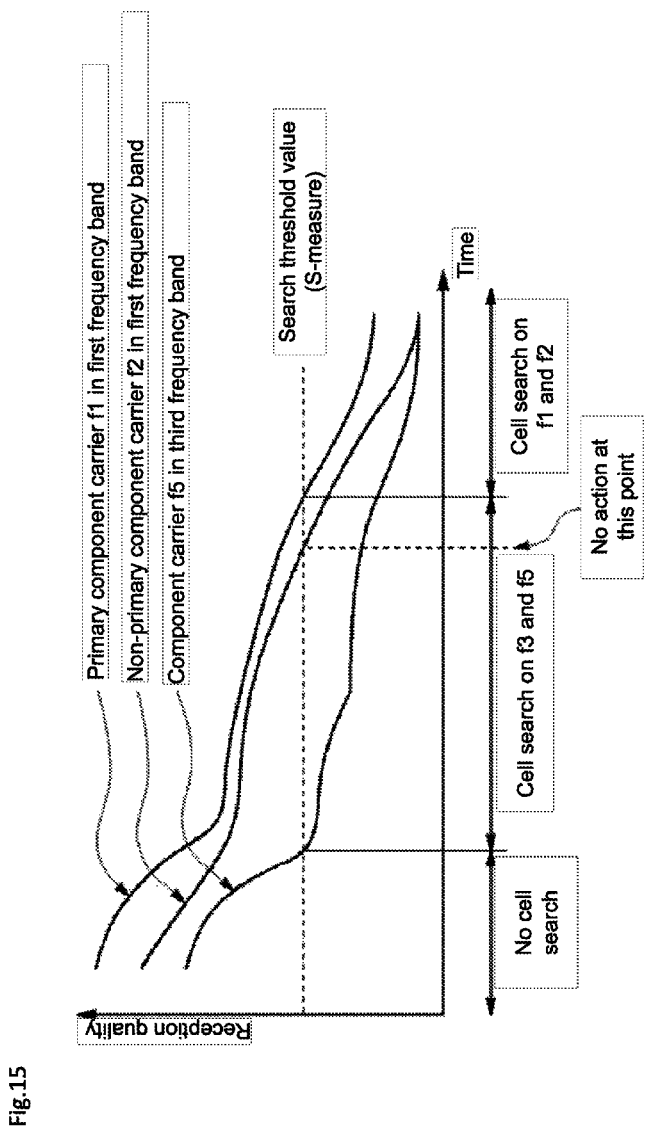
FIG. 15 shows the timing for a communication terminal according to a third embodiment to perform a cell search.

FIG. 15 shows the timing for the communication terminal 3 according to the third embodiment to perform a cell search. As with the first and second embodiments described above, a cell search is not performed when the quality of all component carriers is above the search threshold value.

Then when the quality of the component carrier f5 in the third frequency band falls below the search threshold value, the communication terminal 3 starts a cell search on the component carrier f5 as in the second embodiment.

At the same time, the communication terminal 3 of the embodiment checks the data reception mode of the component carrier f5. Specifically, the communication terminal 3 checks whether the component carrier f5 is configured for DRX (Discontinuous reception) or not and whether there has been no data reception for a while or not. In such reception mode, it may not be indispensable to continuously maintain the connection on the component carrier f5. Along with the cell search process on the component carrier f5, the communication terminal 3 automatically sets gap periods for the component carrier f5, and performs a cell search on the non-carrier-aggregated component carrier f3.

This allows a cell search to be performed on another component carrier without an instruction to set gaps from the base station 30 even under circumstances where it is not used for carrier aggregation and a cell search cannot be performed on extra component carriers because of the limit of the ability of the communication terminal 3 (the number of component carriers on which the communication terminal 3 can be connected at the same time).

Figure 16:
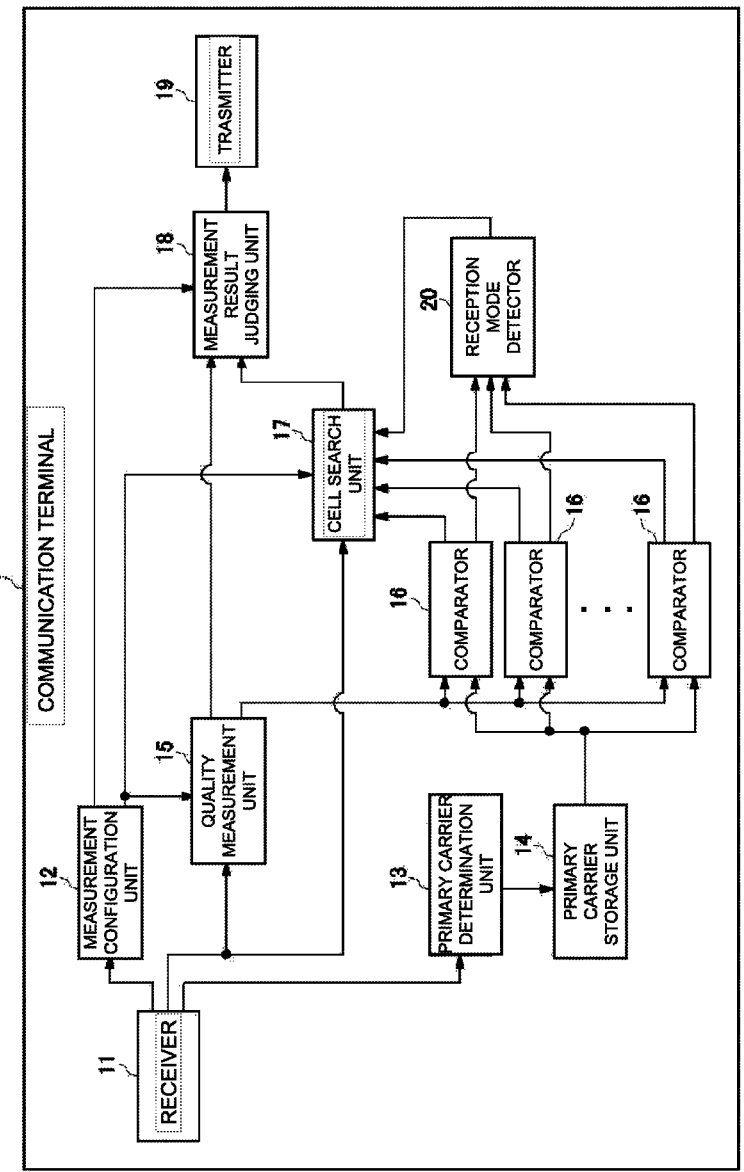
FIG. 16 shows a configuration of the communication terminal of the third embodiment.

FIG. 16 shows a configuration of the communication terminal 3 of the third embodiment. The configuration of the communication terminal 3 of the third embodiment is basically the same as that of the second embodiment, but is different therefrom in that the communication terminal 3 of the third embodiment has a reception mode detector 20. A description will be given below of the configuration of the communication terminal 3, centering on differences with the second embodiment.

At the start of a cell search, the comparators 16 instruct the reception mode detector 20 about a component carrier on which the cell search is determined to be performed, and instruct the reception mode detector 20 to check the reception mode of the component carrier concerned.

Based on the instructions from the comparators 16, the reception mode detector 20 checks the reception mode of the specified component carrier. The reception mode is checked here about the presence or absence of previously described DRX, about the presence or absence of data reception, and so on. If the judgment result indicates that DRX is performed or that data has not been received for a certain period of time, the reception mode detector 20 determines that the communication terminal 3 can set gap periods for the component carrier concerned, and notifies the cell search unit 17 of the information.

Based on the notification from the reception mode detector 20, the cell search unit 17 automatically sets gap periods for the currently carrier-aggregated component carrier, and performs a cell search on a non-carrier-aggregated component carrier.

Figure 17:
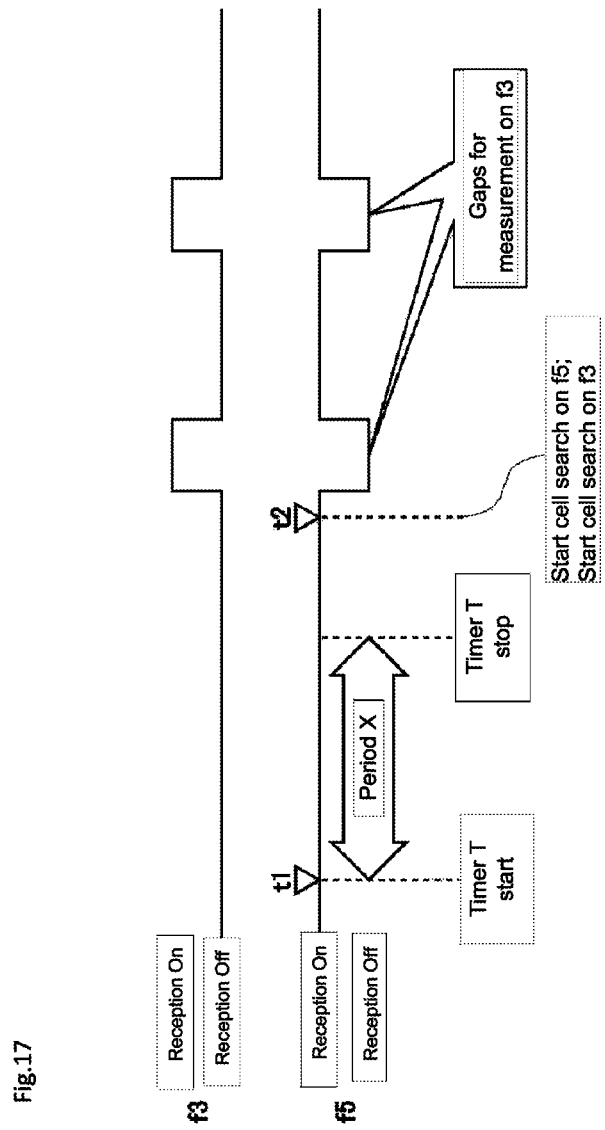
FIG. 17 shows the timing of gaps set by the communication terminal of the third embodiment.

FIG. 17 shows the timing of gaps set by the communication terminal 3 of the embodiment. Time t1 is a time when data was received last on the component carrier f5. Time t2 is a time when a cell search was started on the component carrier f5. This is a time when the quality of the component carrier f5 fell below the search threshold value in FIG. 15.

The communication terminal 3 checks at the time t2 the status of this component carrier. If elapsed time from the time t1 (the timer T in FIG. 17) exceeds a certain period of time (the period X in the figure), gap periods are set for the component carrier f5 at the time point, and a cell search is performed on the component carrier f3.

The "certain period of time" is a threshold value for determining whether or not to create gaps. This certain period of time X may be notified of to the communication terminal 3 through broadcast information (a form like a notification such as an IE "T300" transmitted in SIB2 described in Non-patent document 3), or may be notified of individually to the communication terminal 3 (a notification like an IE "drx-InactivityTimer" etc. included in an RRC Connection Reconfiguration message described in Non-patent document 3), or may be a fixed value.

Figure 18:
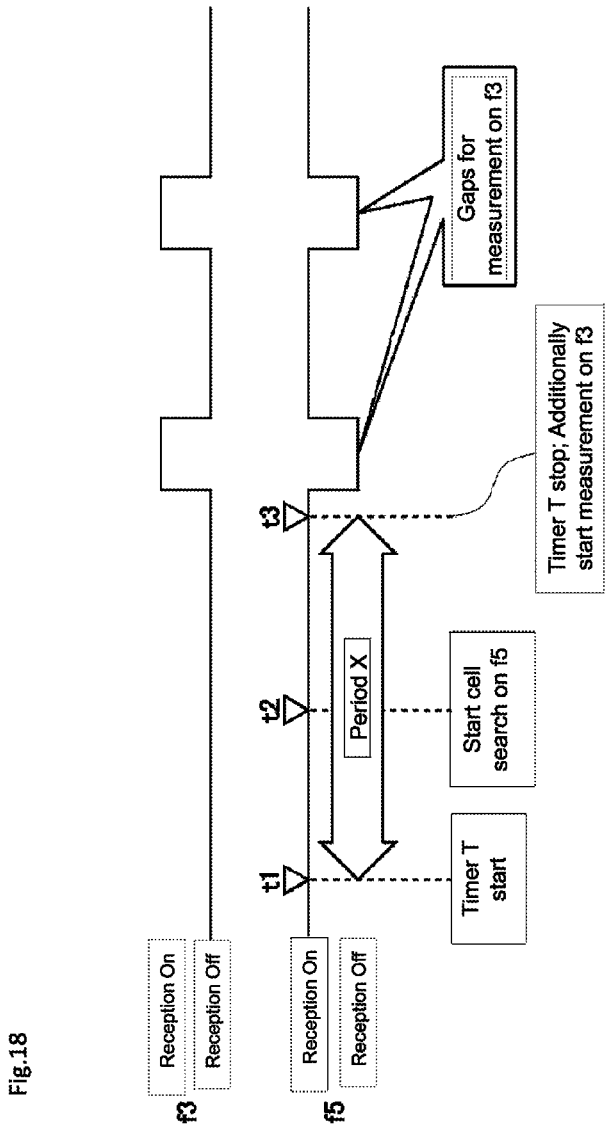
FIG. 18 shows the timing of gaps set by the communication terminal of the third embodiment.

In an example shown in FIG. 18, the timer T has not yet reached the period X at the time t2. When the timer T reaches the period X (time t3), gaps are set and a cell search is started on the component carrier f3.

The length and timing of the gap periods may be set freely by the communication terminal 3, or may be set by the communication terminal 3 based on information specified by the base station 30. If the base station 30 specifies them, it may specify the length of one gap, the cycle of creating gaps, and the timing of creating gaps (e.g. from which subframe in SFN (System Frame Number) mod=Y, etc.). This setting may be notified of through broadcast information, or may be notified of individually to the communication terminal 3.

In FIGS. 17 and 18 an operation is shown where whether gap periods can be set or not is judged on whether data has been received on the component carrier or not but, as described above, gap periods can be set if the DRX operation is performed. The DRX operation is provided in Non-patent document 4. In this case, gap periods are set so that a cell search is performed on the component carrier f3 at a time when the communication terminal 3 is not receiving data from the component carrier f5.

Figure 19:
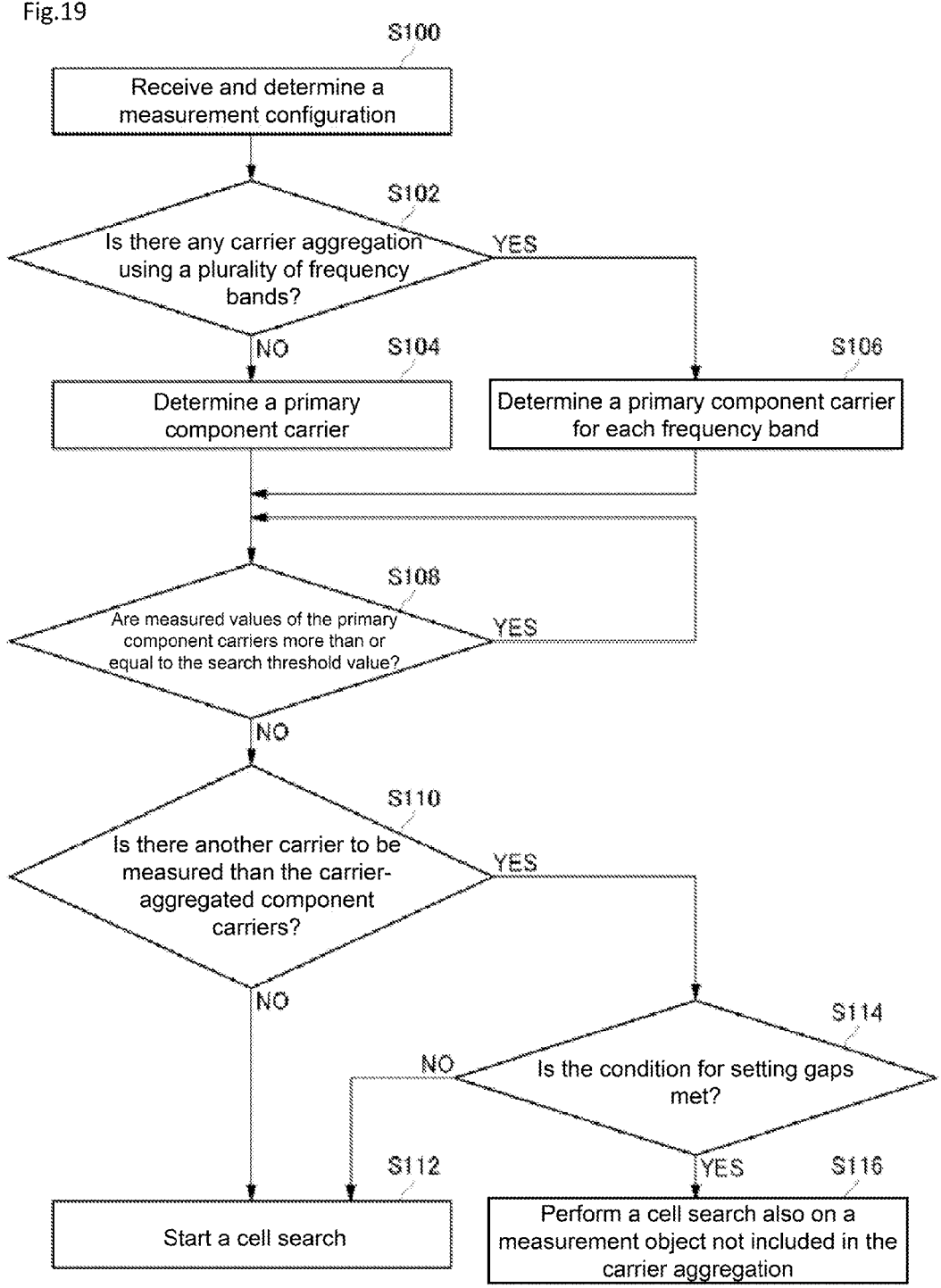
FIG. 19 shows an operation of the communication terminal of the third embodiment.

FIG. 19 shows an operation of the communication terminal 3 of the third embodiment. The communication terminal 3 receives information on measurement (a measurement configuration) transmitted from the base station 30, and determines the measurement configuration by means of the measurement configuration unit 12 (S100). The communication terminal 3 then judges whether a plurality of frequency bands are used in carrier aggregation or not (S102).

If a plurality of frequency bands are judged not to be used (No at S102), the communication terminal 3 determines a primary component carrier (S104). The method described in the first embodiment can be used for this. If a plurality of frequency bands are judged to be used (Yes at S102), the communication terminal 3 determines a primary component carrier for each frequency band (S106).

The comparators 16 of the communication terminal 3 then judge whether the quality of the primary component carriers is more than or equal to the search threshold value or not (S108). If the quality of the primary component carriers is more than or equal to the search threshold value (Yes at S108), the communication terminal 3 does not perform a cell search but monitors the quality of the primary component carriers until it falls below the search threshold value. If the quality of any primary component carrier is not more than or equal to the search threshold value (No at S108), the communication terminal 3 judges whether there is a carrier to be measured other than the carrier-aggregated component carriers or not (S110). If the result of this judgment indicates that there is no other carrier to be measured, the communication terminal 3 starts a cell search for the frequency band including the component carrier that is below the search threshold value (S112).

If there is a carrier to be measured other than the carrier-aggregated component carriers, the communication terminal 3 judges whether a condition for setting gap periods for performing a cell search on the carrier is met or not (S114). The condition for setting gap periods is a condition in which data has not been received for a period of time or DRX reception is performed on the component carrier that is below the search threshold value.

If the condition for setting gap periods is not met (No at S114), the communication terminal 3 starts a cell search for the frequency band including the component carrier that is below the search threshold value (S112). If the condition for setting gap periods is met (Yes at S114), the communication terminal 3 starts a cell search on a carrier to be measured that is not currently included in the carrier aggregation, as well as a cell search on the frequency band that is below the search threshold value (S116). This is a description of a configuration and an operation of the communication terminal 3 of the third embodiment.

Thus, if data has not been received for a period of time on a carrier-aggregated component carrier, a cell search can be performed, by setting gap periods for the component carrier, on another carrier that is not in the carrier aggregation with limited influence on the reception process in the current connection. The case where data has not been received for a period of time includes a case where DRX reception is performed and therefore data has not been received during the reception intervals.

While in the above-described embodiment a cell search is performed if a condition for setting gap periods (DRX mentioned above etc.) is met, whether or not to measure for a component carrier may be controlled by assigning priorities to the component carriers, in addition to the above condition.

In the example shown in FIG. 15 for example, suppose that the priority of the component carrier f3 is set high and the priority of the component carrier f5 is set low. In this case, since the priority of the component carrier f3 is higher than that of the component carrier f5, a cell search is performed on the component carrier f3 as described in the embodiment. Conversely, it is possible not to perform a cell search on the component carrier f3 if the priority of the component carrier f3 is set low and the priority of the component carrier f5 is set high.

The priority of each component carrier here is a concept close to the frequency priority introduced in 3GPP Rel-8. The frequency priority introduced in 3GPP Rel-8, however, is the priority for the communication terminal 3 in an idle state or the like to select a frequency when it performs mobility control without any instruction from the network and, on the other hand, the priority in this example is different in that it is used for determining for which frequency a cell search is preferentially performed when the communication terminal 3 performs mobility control with an instruction received from the network. For this reason, this priority of each component carrier needs to be used also for the communication terminal 3 in an active state. The notification may be made to the communication terminal 3 by broadcast information, or by an individual message. The communication terminal 3 stores the priority information notified of in a storage unit (a carrier priority storage unit) in advance so that it can read and use the information as required.

While in the embodiment a case has been shown in which a cell search is performed on a component carrier in the same system, i.e. LTE, without gap periods specified by the base station, the measurement may be made for another system such as UMTS, GSM, CDMA 2000, WiMAX, or the like.

While the embodiment has been described based on the second embodiment in which the search operation is determined for each frequency band, it may be applied to the first embodiment which does not have the concept of the search operation for each frequency band.

(Fourth Embodiment)

A communication terminal 4 of a fourth embodiment will be described below. The configuration of the communication terminal 4 of the fourth embodiment is basically the same as that of the first embodiment, but is different therefrom in that it uses a plurality of search threshold values. The base station 30 of the fourth embodiment is the same as that of the first embodiment (see FIG. 8).

Figure 20:
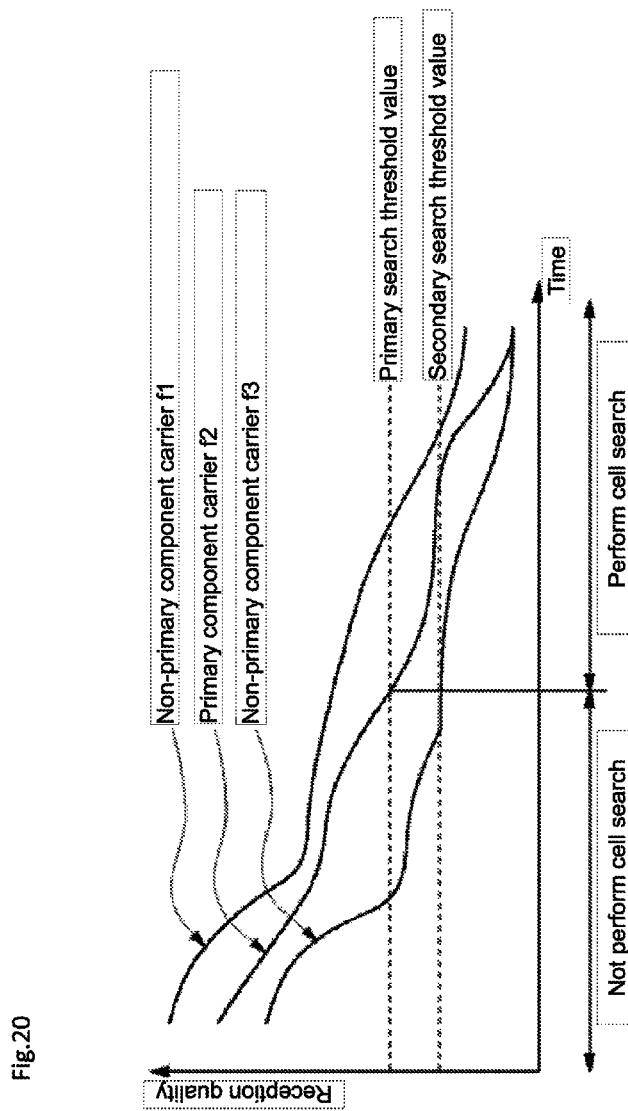
FIG. 20 shows the timing for a communication terminal according to a fourth embodiment to perform a cell search.
Figure 21:
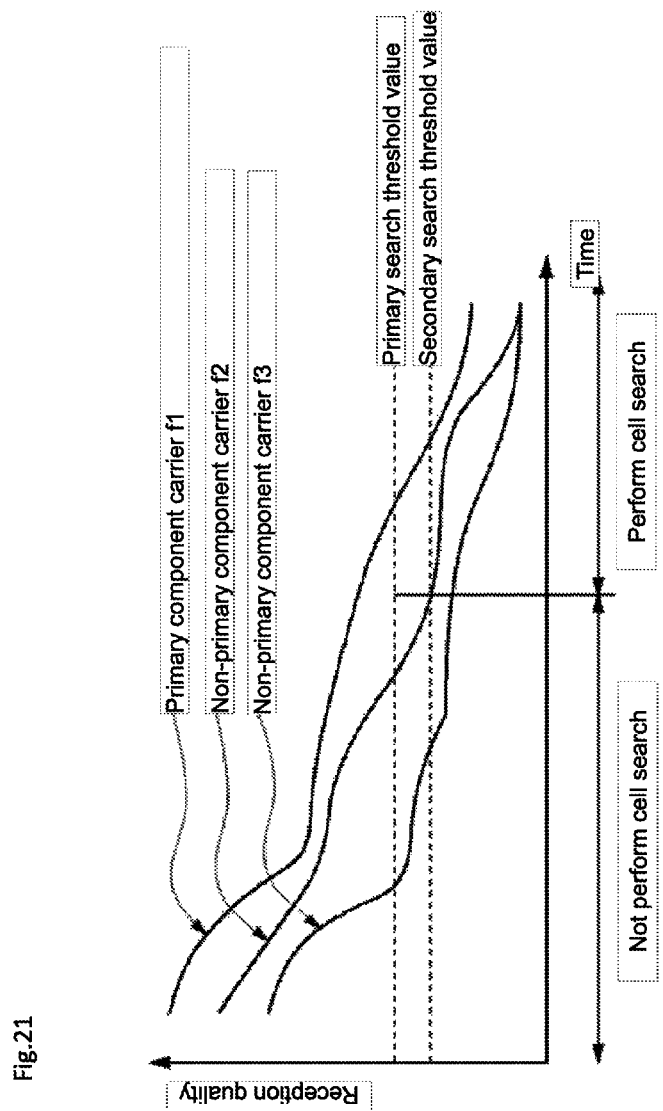
FIG. 21 shows the timing for the communication terminal according to the fourth embodiment to perform a cell search.

FIGS. 20 and 21 show the timing for the communication terminal 4 according to the fourth embodiment to perform a cell search. A primary search threshold value is used for a primary component carrier, and a secondary search threshold value is used for component carriers other than a primary.

This allows a cell search to be started when a primary component carrier falls below the primary search threshold value as shown in FIG. 20 or when all component carriers except for the primary fall below the secondary search threshold value as shown in FIG. 21.

Figure 22:
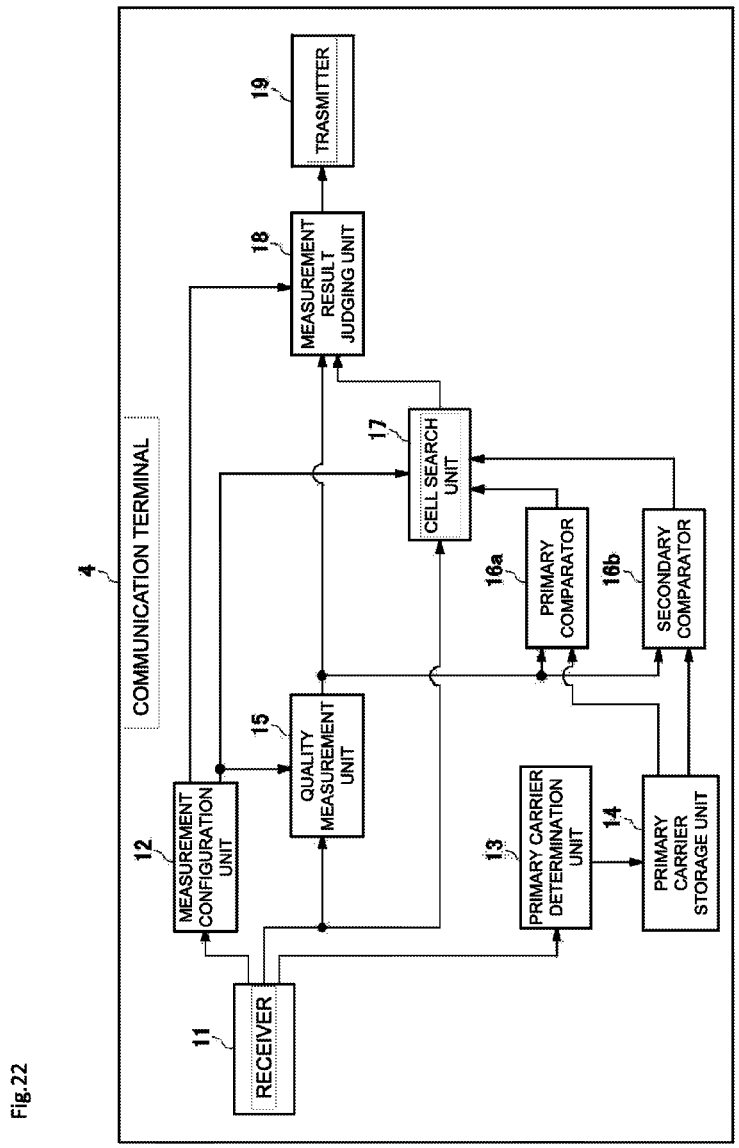
FIG. 22 shows a configuration of the communication terminal of the fourth embodiment.

FIG. 22 shows a configuration of the communication terminal 4 of the fourth embodiment. The configuration of the communication terminal 4 of the fourth embodiment is basically the same as that of the first embodiment (see FIG. 2), but is different therefrom in that it has a primary comparator 16a and a secondary comparator 16b. A description will be given below, centering on differences with the first embodiment.

The primary carrier determination unit 13 notifies the primary comparator 16a of a primary component carrier, and notifies the secondary comparator 16b of the other component carriers.

The primary comparator 16a judges whether the primary component carrier is below the primary search threshold value or not, and notifies the cell search unit 17 of the judgment result. The secondary comparator 16b judges whether all the component carriers other than the primary are below the secondary search threshold value, and notifies the cell search unit 17 of the judgment result.

The cell search unit 17 starts a cell search if it is notified to start a cell search by either the primary comparator 16a or the secondary comparator 16b.

Figure 23:
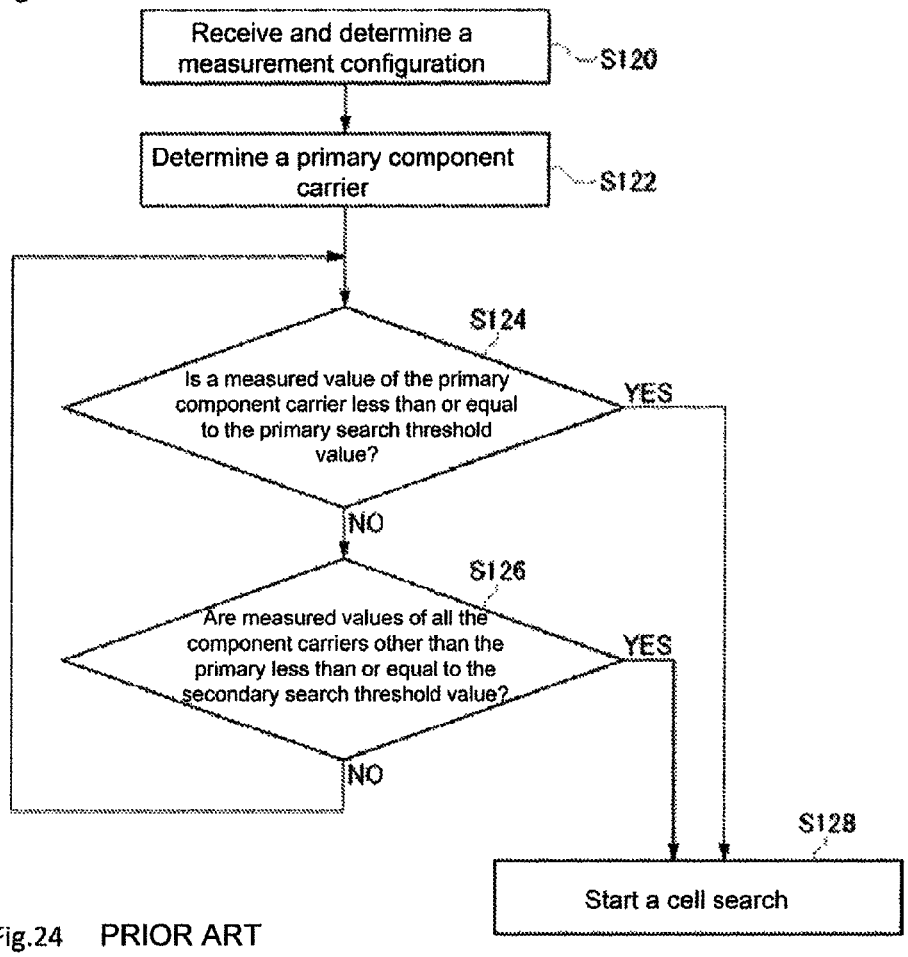
FIG. 23 shows an operation of the communication terminal of the fourth embodiment.
Figure 24:
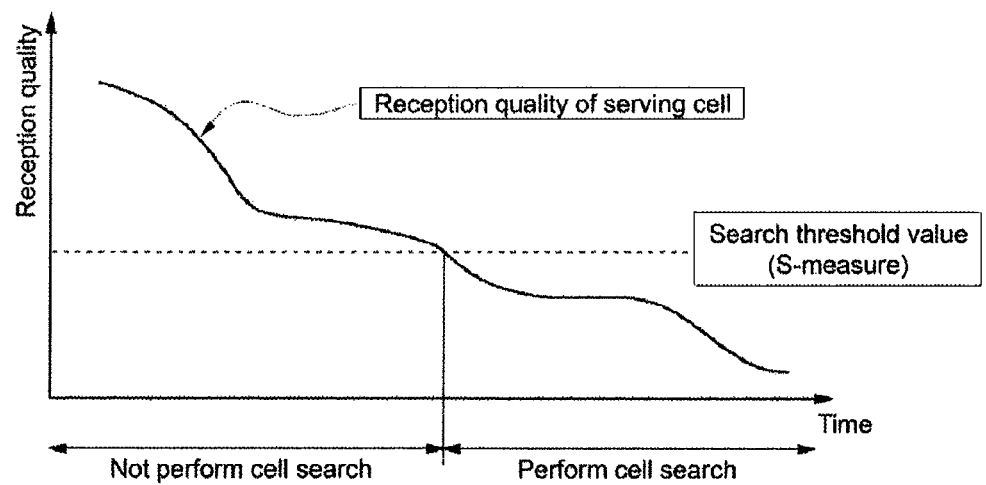
FIG. 24 illustrates a search threshold value.
Figure 25:
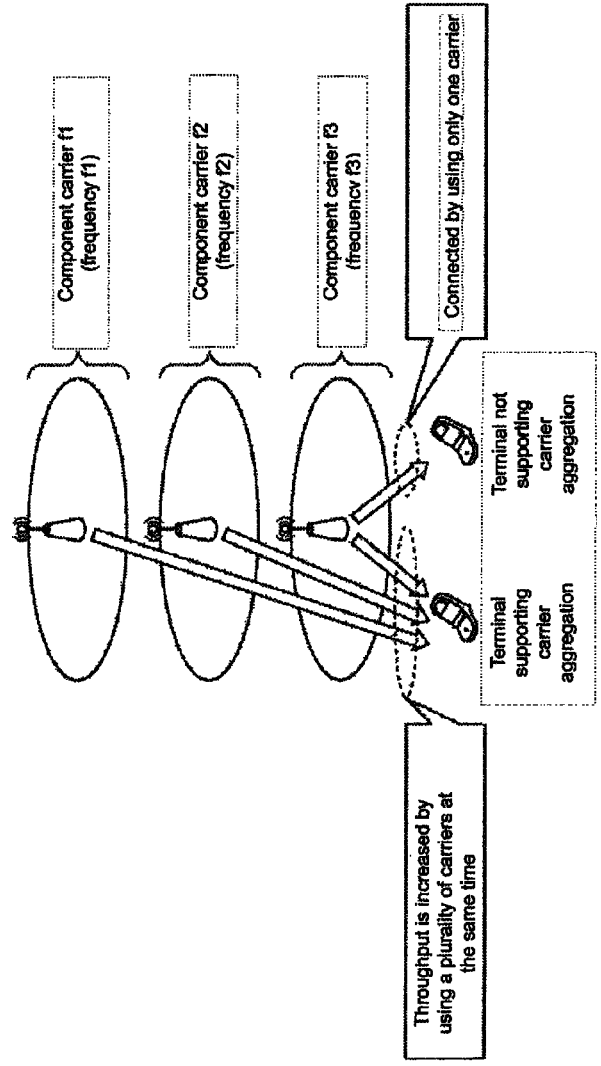
FIG. 25 is a conceptual diagram illustrating carrier aggregation.

FIG. 23 is a flowchart showing an operation of the communication terminal 4. The communication terminal 4 receives information on measurement (a measurement configuration) transmitted from the base station 30, and determines the measurement configuration by means of the measurement configuration unit 12 (S120). The communication terminal 4 then determines a primary component carrier (S122). The method described in the first embodiment can be used for this.

The comparator 16a of the communication terminal 4 then judges whether the quality of the primary component carrier is less than or equal to the primary search threshold value or not (S124). If the quality of the primary component carrier is less than or equal to the primary search threshold value (Yes at S124), the communication terminal 4 starts a cell search (S128).

If the quality of the primary component carrier is not less than or equal to the primary search threshold value (No at S124), the secondary comparator 16b of the communication terminal 4 judges whether all the component carriers other than the primary are less than or equal to the secondary search threshold value or not (S126).

If the quality of the component carriers other than the primary is less than or equal to the secondary search threshold value (Yes at S126), the communication terminal 4 starts a cell search (S128). If the quality of the component carriers other than the primary is not less than or equal to the secondary search threshold value (No at S126), the communication terminal 4 does not perform a cell search, but returns to the process of judging the measured value of the primary component carrier (S124). This is a description of a configuration and an operation of the communication terminal 4 of the fourth embodiment.

Since the communication terminal 4 of the embodiment uses the secondary search threshold value, in addition to the primary search threshold value, to judge the measured values of the component carriers other than the primary, it can detect another cell in less time when the quality of all the component carriers other than the primary decreases.

While in the embodiment the condition is that all the component carriers other than the primary fall below the secondary search threshold value, it may be that one or a certain number of the component carriers other than the primary fall below the secondary search threshold value.

While in the invention a cell search is started if the quality of the primary component carrier falls below the primary search threshold value or if the quality of all the component carriers other than the primary falls below the secondary search threshold value, a cell search may be started if both conditions are met.

When a DRX operation is performed in which a communication terminal does not receive for a long while, the comparison operation may be combined with DRX and be changed to an operation in which the comparison is made only between the reception quality of a primary component carrier and the primary search threshold value. This is because it is desired to reduce the number of performing the search process since a reduction in power consumption is greatly required when DRX is performed. Another reason is that a failure in handover or the like does not have much influence since there is no transmission and reception of data during a DRX operation in which a communication terminal does not receive for a long while. As a method that produces an effect similar to this, there may be an operation in which the secondary search threshold value is lowered when DRX is performed.

(Fifth Embodiment)

A communication terminal 5 of a fifth embodiment will be described below. The configuration of the communication terminal 5 of the fifth embodiment is basically the same as that of the first embodiment, but is different therefrom in that it uses, for each component carrier, an index that takes into account as the reception quality not only the reception strength but also interference.

The "S-measure," defined in the previously described Non-patent document 3, is provided by using RSRP (Reference Signal Received Power). This RSRP indicates the reception strength, which means that the need for a neighboring cell search process is determined by using the reception strength as the reception quality.

Figure 31:
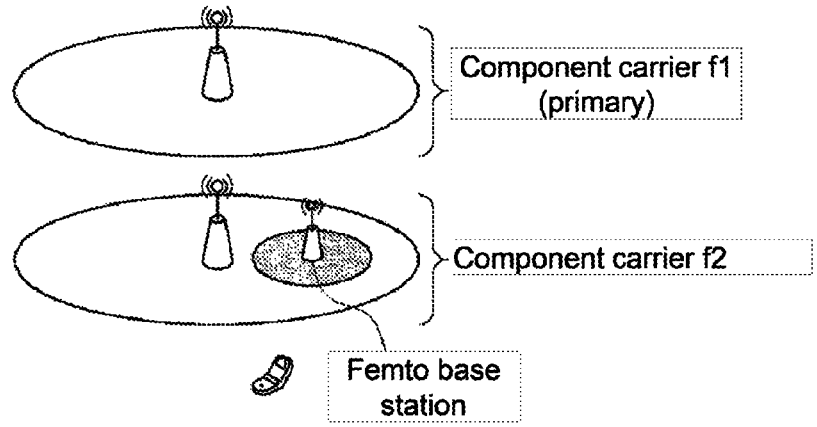
FIG. 31 shows a scenario example of carrier aggregation.
Figure 32:
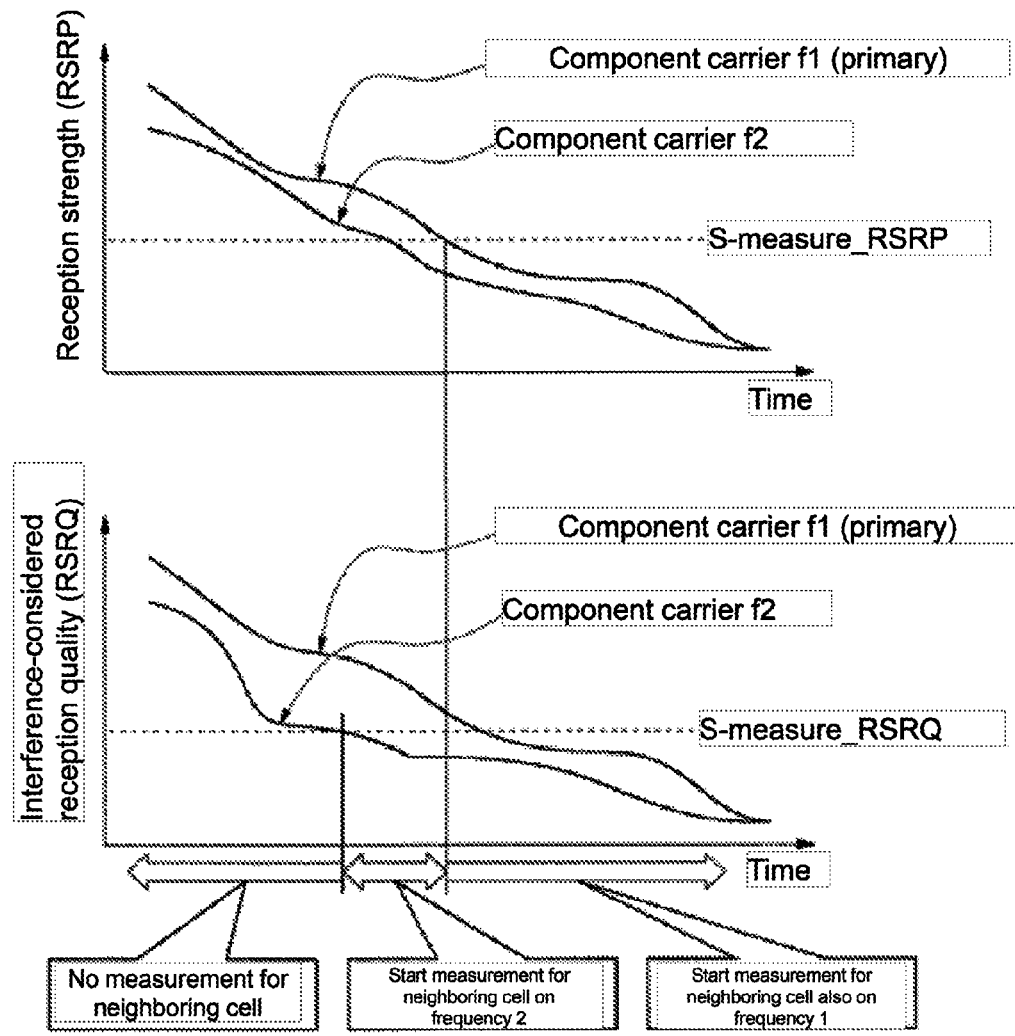
FIG. 32 shows the timing for a communication terminal according to a fifth embodiment to perform a cell search.

A possible weakness of this case in which the need for a neighboring cell search process is determined by using the reception strength is that even if the quality of a serving cell is sufficient, there is an interfering cell and the cell cannot be detected. This problem is shown in FIG. 31. Suppose here that there are component carriers f1 and f2, that the component carrier f1 is set as a primary, and that a femto base station is installed on the component carrier f2. In the first embodiment, the need for a search and quality measurement for a neighboring cell is judged by using as the reception quality the reception strength of the component carrier f1 set as the primary. In this case, a communication terminal may exist near the femto base station on the component carrier f2 even when the quality of the component carrier f1 is sufficient. The communication terminal does not perform a search and quality measurement for a neighboring cell, therefore cannot detect the presence of the femto base station, and may suffer interference from the femto base station or may cause interference to a communication terminal connected to the femto base station. This problem may not be solved even by using as a search threshold value the reception quality based on the reception strength of the component carrier f2. This is because there may be interference from the femto base station even if the reception strength of a serving cell on the component carrier f2 is sufficiently high. A solution to this may be the use of interference-considered reception quality as shown in FIG. 32. RSRQ (Reference Signal Received Quality) described in Non-patent document 3 is the reception quality that takes into account not only the reception strength but also interference. Thus, an operation of making a comparison by using S-measure_RSRQ for each component carrier is defined in addition to the operation described in the first embodiment, in which a comparison is made by using S-measure_RSRP based on RSRP for a primary component carrier. That is, referring to the example in FIG. 32, the primary component carrier frequency 1 is compared to the S-measure_RSRP and, when the quality of the component carrier f1 becomes worse than the S-measure_RSRP, all the configured search and measurement processes are started as in the first embodiment. In addition, the quality of the component carriers f1 and f2 is compared to the S-measure_RSRQ and, when the quality of the component carrier f2 becomes worse than the S-measure_RSRQ, the configured search and measurement for a neighboring cell are started on the component carrier f2. This allows the communication terminal 5 to reliably detect a femto base station when there is one as shown in FIG. 31.

While a case is shown in FIG. 32 where the RSRQ of the component carrier f2 becomes worse first, there may be a case where the RSRQ of the component carrier f1 becomes worse first to be worse than the S-measure_RSRQ. In such a case, it is also possible that a search and measurement for a neighboring cell is started on the component carrier f1 and not on the component carrier f2. Conversely, all the configured neighboring cell search and measurement processes can also be performed if the quality of the primary component carrier becomes worse than either the S-measure_RSRP or the S-measure_RSRQ.

This S-measure_RSRQ is required only when there is a femto base station or the like on the network side and its interference to a communication terminal cannot be estimated based on a primary component carrier. For this reason, there may be an operation that does not use S-measure_RSRQ. The operation in that case may be according to the first embodiment not with S-measure_RSRQ being transmitted but only with S-measure_RSRP. In a case where component carriers to install femto base stations on are limited, it is also conceivable to compare only such component carriers to S-measure_RSRQ. One way to achieve this may be that a base station notifies a communication terminal of component carriers to be compared to S-measure_RSRQ.

Figure 33:
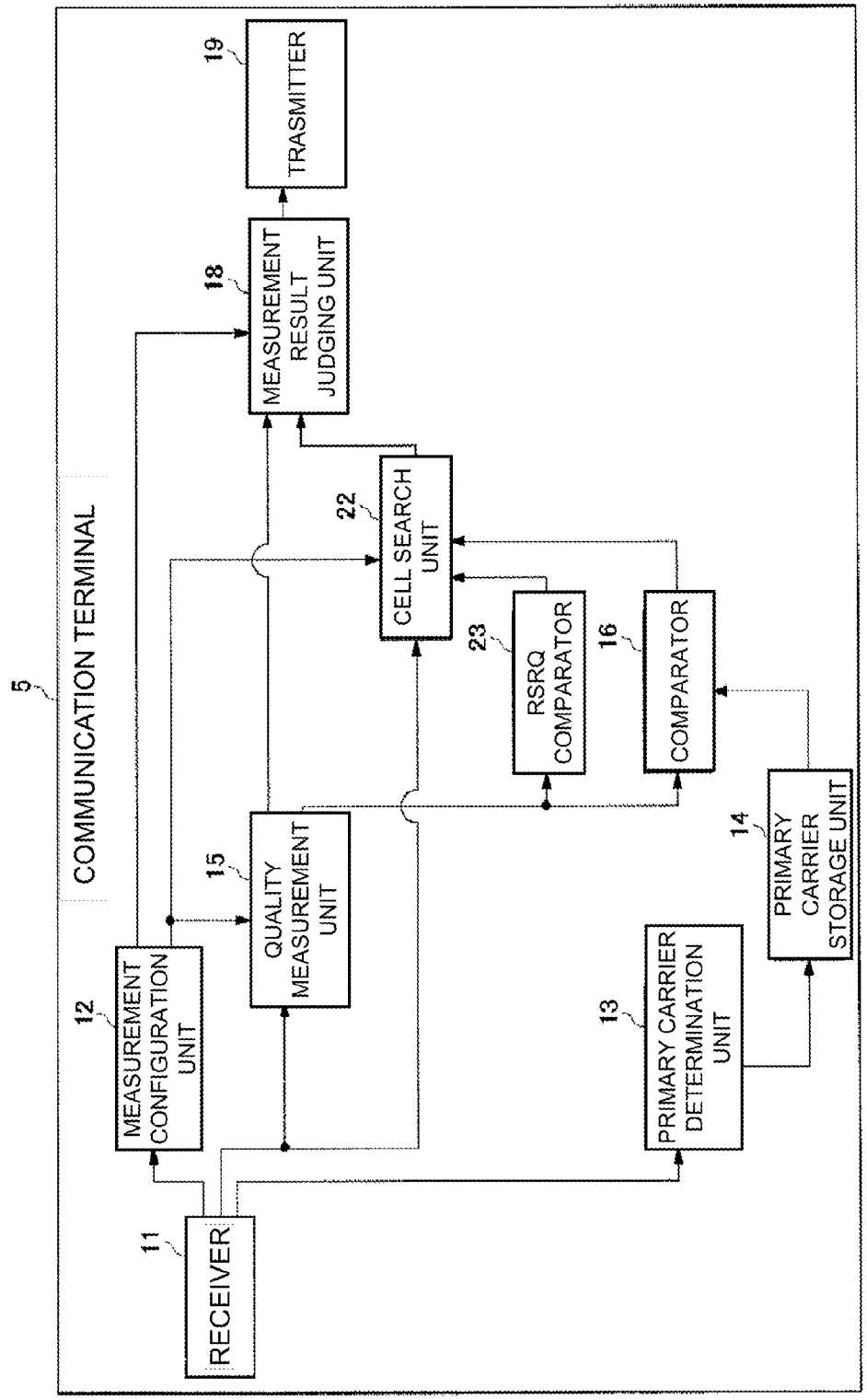
FIG. 33 shows a configuration of the communication terminal according to the fifth embodiment.
Figure 34:
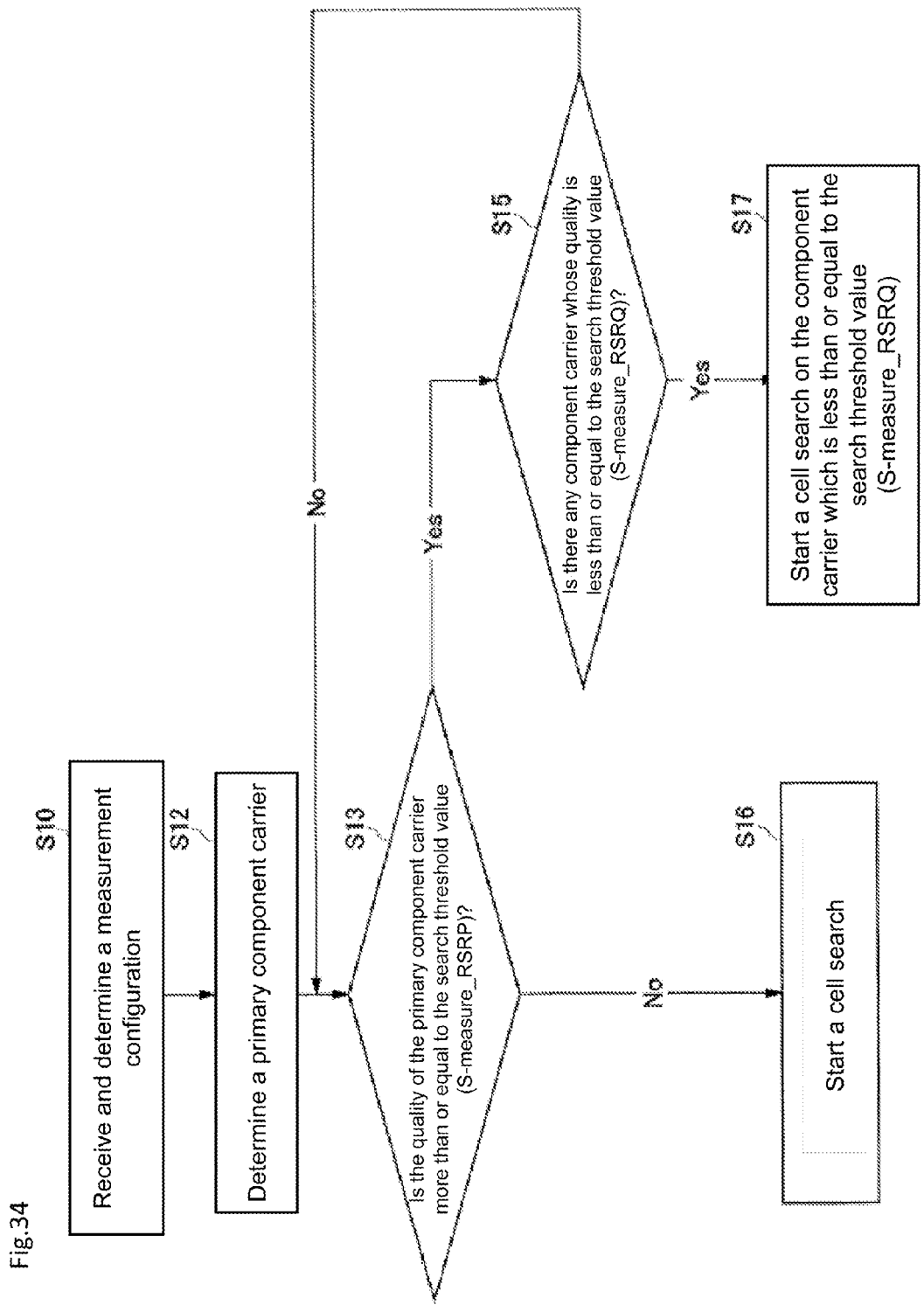
FIG. 34 shows an operation of the communication terminal according to the fifth embodiment.

FIGS. 33 and 34 show a block diagram and a flowchart, respectively, of the communication terminal 5 for achieving the above operation. Differences with the above-described embodiments will be described below with reference to FIG. 33 first.

An RSRQ comparator 23 compares a quality measurement result for each component carrier to a search threshold value for RSRQ passed from the measurement configuration unit 12, and determines whether to start a cell search or not for each component carrier. The RSRQ comparator 23 notifies the cell search unit 22 of the determination result. If this operation is to be used only for certain component carriers here, the measurement configuration unit 12 specifies the certain component carriers.

The cell search unit 22 uses both comparison results received from the comparator 16 and received from the RSRQ comparator 23 to determine whether or not to perform a cell search. If the cell search unit 22 determines to perform a cell search, it does so according to the details configured by the measurement configuration unit 12 and performs quality measurement for a detected cell. The cell search unit 22 sends the measurement result to the measurement result judging unit 18. An operation of the cell search unit 22 for determining whether or not to perform a cell search is shown in FIG. 34.

FIG. 34 shows an operation of the communication terminal 5. A description will be given below of an operation of the communication terminal 5 for determining whether or not to perform a cell search, centering on differences with the above-described embodiments. The measurement configuration unit 12 of the communication terminal 5 receives a measurement configuration transmitted from the base station 30 and sets the configuration values (S10), and the primary carrier determination unit 13 determines a primary component carrier to be compared to a search threshold value (S12); the operation is so far the same as that in the first embodiment. The communication terminal 5 then judges whether a measured value of the reception quality of the primary component carrier is more than or equal to the search threshold value or not (S13). This operation is almost the same as step S14 shown in FIG. 3, but is different therefrom in that the operation goes on to step S15 if the judgment result is "Yes." In step S15, the communication terminal 5 checks whether there is any component carrier whose quality is less than or equal to the search threshold value or not. Not RSRP, which is used in step S13, but RSRQ is used here for the comparison to the search threshold value. If there is a component carrier whose quality is less than or equal to the search threshold value in this step, a neighboring cell search and neighboring cell measurement are performed on the component carrier concerned (S17).

The embodiment allows a terminal to detect an interfering cell even in circumstances such as those shown in FIG. 31, and to perform a process, for example, to stop the use of the component carrier f2. This can realize an efficient carrier aggregation.

The concept of frequency band may be introduced into the embodiment. Specifically, in a case where there are component carriers f2 and f3 in the same frequency band (e.g. 800 MHz band) and the two component carriers are used, if the quality (RSRQ in this case) of either one of the component carriers falls below a search threshold value (S-measure_RSRQ), a cell search may be performed on both component carriers f2 and f3 in the same frequency band. In addition, if there is another component carrier f4 that is not currently used in the same frequency band but is in the measurement configuration, the measurement for the component carrier f4 may also be started.

While there have been described what are at present considered to be preferred embodiments of the invention, various modifications and variations may be made thereto, and it is intended that appended claims cover all such modifications and variations as fall within the true spirit and scope of the invention.

INDUSTRIAL APPLICABILITY

The invention has an advantage of allowing even a communication terminal supporting carrier aggregation to appropriately start a cell search, and is useful as a communication terminal, a base station, and the like that support carrier aggregation.

DESCRIPTION OF THE SYMBOLS 1-4: Communication terminal
11: Receiver
12: Measurement configuration unit
13: Primary carrier determination unit 14: Primary carrier storage unit
15: Quality measurement unit
16: Comparator
16a: Primary comparator
16b: Secondary comparator
17: Cell search unit
18: Measurement result judging unit
19: Transmitter
20: Reception mode detector
30: Base station
31: Terminal information manager
32: Aggregation determination unit
33: Primary determination unit
34: Configuration determination unit
35: Transmitter

The invention claimed is:

1. A communication terminal comprising:
communication circuitry configured to communicate with a first base station simultaneously through a plurality of carriers by carrier aggregation, wherein the plurality of carriers include at least a primary carrier through which the communication terminal is connected to a serving primary cell and a secondary carrier through which the communication terminal is connected to a serving secondary cell, the serving primary and secondary cells being supported by the first base station, and
control circuitry configured to measure the reception quality of radio signals transmitted through the plurality of carriers from the first base station to obtain measured values, and
compare the measured value of the primary carrier to a first threshold value, and
compare the measured value of the secondary carrier to a second threshold value;
wherein the control circuitry,
when discontinuous reception (DRX) is enabled,
when the measured value of the primary carrier is lower than the first threshold value, performs a cell search for a first corresponding carrier of a first neighbouring cell different from the serving primary cell and for a second corresponding carrier of a second neighbouring cell different from the serving secondary cell, wherein the first and second neighbouring cells are target cells for the communication terminal to connect to through the first and second corresponding carriers and are supported by a second base station different from the first base station, and measures the reception quality of radio signals transmitted through the first and second corresponding carriers of the first and second neighboring cells; and
when the measured value of the primary carrier is equal to or higher than the first threshold value, does not perform the cell search; and
when the DRX is disabled, determines whether or not to perform the cell search based on the measured value of the primary carrier and the measured value of the secondary carrier.

2. The communication terminal according to claim 1, wherein the primary carrier is a backward compatible component carrier and the secondary carrier is a non-backward compatible component carrier.

3. The communication terminal according to claim 1, wherein the primary carrier is set by the first base station.

4. The communication terminal according to claim 1, wherein the primary carrier is set by the communication terminal.

5. The communication terminal according to claim 1, wherein
when the DRX is disabled, the control circuitry determines to perform the cell search when the measured value of the primary carrier is lower than the first threshold value and the measured value of the secondary carrier is lower than the second threshold value.

6. The communication terminal according to claim 1, wherein the control circuitry is further configured to:
identify the primary carrier of each of at least two groups into which the plurality of carriers are classified by frequency band,
compare the measured value of a frequency-band-specific primary carrier of each group to the first threshold value, and
perform the cell search in each group when the measured value of the frequency-band-specific primary carrier of the group is lower than the first threshold value.

7. The communication terminal according to claim 1, wherein the control circuitry is further configured to:
determine whether any of the plurality of carriers is not used to receive data from the first base station for a defined period; and
set a gap period for the carrier determined to be not used for the defined period, and search for a cell on another carrier that is not part of the carrier aggregation.

8. The communication terminal according to claim 7, wherein the control circuitry is further configured to:
determine whether the other carrier that is not part of the carrier aggregation is of higher priority than the carrier determined to be not used for the defined period.

9. A method performed by a communication terminal, the method comprising:
controlling communication with a first base station simultaneously through a plurality of carriers by carrier aggregation, wherein the plurality of carriers include at least a primary carrier through which the communication terminal is connected to a serving primary cell and a secondary carrier through which the communication terminal is connected to a serving secondary cell, the serving primary and secondary cells being supported by the first base station;
measuring the reception quality of radio signals transmitted through the plurality of carriers from the first base station to obtain measured values;
comparing the measured value of the primary carrier to a first threshold value;
comparing the measured value of the secondary carrier to a second threshold value;
when discontinuous reception (DRX) is enabled,
when the measured value of the primary carrier is lower than the first threshold value, performing a cell search for a first corresponding carrier of a first neighbouring cell different from the serving primary cell and for a second corresponding carrier of a second neighbouring cell different from the serving secondary cell, wherein the first and second neighbouring cells are target cells for the communication terminal to connect to through the first and second corresponding carriers and are supported by a second base station different from the first base station, and measuring the reception quality of radio signals transmitted through the first and second corresponding carriers of the first and second neighboring cells; and when the measured value of the primary carrier is equal to or higher than the first threshold value, not performing the cell search; and when the DRX is disabled, determining whether or not to perform the cell search based on the measured value of the primary carrier and the measured value of the secondary carrier.

10. The method according to claim 9, wherein when the DRX is disabled, determining to perform the cell search when the measured value of the primary carrier is lower than the first threshold value and the measured value of the secondary carrier is lower than the second threshold value.

11. The method according to claim 9, further comprising:

identifying the primary carrier of each of at least two groups into which the plurality of carriers are classified by frequency band, wherein the step of comparing the measured value of the primary carrier includes comparing the measured value of a frequency-band-specific primary carrier of each group to the first threshold value, and the step of performing the cell search occurs in each group when the measured value of the frequency-band-specific primary carrier of the group is lower than the first threshold value.

12. The method according to claim 9, further comprising:

determining whether any of the plurality of carriers is not used to receive data from the first base station for a defined period; and setting a gap period for the carrier determined to be not used for the defined period, and searching for a cell on another carrier that is not part of the carrier aggregation.

13. The method according to claim 12, further comprising:

determining whether the other carrier that is not part of the carrier aggregation is of higher priority than the carrier determined to be not used for the defined period.

14. The method according to claim 9, wherein the primary carrier is a backward compatible component carrier and the secondary carrier is a non-backward compatible component carrier.

15. The method according to claim 9, further comprising:

receiving from the first base station information that sets the primary carrier.

16. The method according to claim 9, further comprising:

setting the primary carrier according to a defined rule.

* * * * *